US008643238B2

(12) United States Patent
Ling

(10) Patent No.: US 8,643,238 B2
(45) Date of Patent: Feb. 4, 2014

(54) INTELLIGENT CASCADED SYNCHRONOUS ELECTRIC MOTOR-GENERATOR TANDEMS OF CUMULATIVE COMPOUND EXCITATION

(76) Inventor: Gangqin Ling, Tainan (TW)

( * ) Notice: Subject to any disclaimer, the term of this patent is extended or adjusted under 35 U.S.C. 154(b) by 429 days.

(21) Appl. No.: 12/448,914

(22) PCT Filed: Jul. 16, 2007

(86) PCT No.: PCT/CN2007/002169
§ 371 (c)(1),
(2), (4) Date: Mar. 12, 2010

(87) PCT Pub. No.: WO2008/086672
PCT Pub. Date: Jul. 24, 2008

(65) Prior Publication Data
US 2010/0171381 A1    Jul. 8, 2010

(30) Foreign Application Priority Data
Jan. 16, 2007   (CN) .......................... 2007 1 0062759

(51) Int. Cl.
*H02K 47/00* (2006.01)
*H02K 21/00* (2006.01)

(52) U.S. Cl.
USPC ............ 310/113; 310/198; 310/184; 310/208

(58) Field of Classification Search
USPC ......... 310/113, 179, 180, 184, 198, 206, 207, 310/208
See application file for complete search history.

(56) References Cited

U.S. PATENT DOCUMENTS

| 2001/0008354 | A1* | 7/2001 | Minagawa | 310/113 |
|---|---|---|---|---|
| 2003/0080711 | A1* | 5/2003 | Stearns | 320/101 |
| 2006/0226721 | A1* | 10/2006 | Dooley et al. | 310/113 |
| 2007/0188036 | A1* | 8/2007 | Shibukawa | 310/113 |

FOREIGN PATENT DOCUMENTS

| CN | 1030331 | | 1/1989 | |
|---|---|---|---|---|
| CN | 2552247 | | 5/2003 | |
| CN | 2552247 Y | * | 5/2003 | |
| CN | 1767333 | | 5/2006 | |
| JP | 59028871 | | 2/1984 | |
| JP | 59028871 A | * | 2/1984 | ............ H02K 53/00 |
| JP | 2006296002 | | 10/2006 | |
| WO | 2006108146 | | 10/2006 | |

OTHER PUBLICATIONS

University Physics, Sears et al, sixth Edition, p. 349-350.*

* cited by examiner

*Primary Examiner* — Tran Nguyen
*Assistant Examiner* — Leda Pham
(74) *Attorney, Agent, or Firm* — Bacon & Thomas, PLLC

(57) ABSTRACT

A intelligent cascaded synchronous electric motor-generator tandem of cumulative compound excitation comprises at least a synchronous electric motor-generator tandem (namely MG tandem), a storage battery cluster and an autotransformer. Each MG tandem comprises at least a pair of motor and generator having a common stator and a common rotor shaft. The storage battery cluster, which provides a DC power to general loads and motor, serves as a DC power reservoir to be recharged by generator. The autotransformer serves to regulate the AC voltage output from generator via multiple output taps thereon for supplying various AC voltages to different external loads. By integrating all components aforesaid with common magnetic flux interacted mutually, upon being energized by DC power from storage battery cluster, the motor will transfer rotational torque to drive the generator in enhanced synergistic manner.

7 Claims, 11 Drawing Sheets

(a)

(b)

INTELLIGENT CASCADED SYNCHRONOUS ELECTRIC MOTOR-GENERATOR TANDEMS OF CUMULATIVE COMPOUND EXCITATION

TECHNICAL FIELD OF THE INVENTION

The present invention relates to an intelligent cascaded synchronous electric motor-generator tandems of cumulative compound excitation (also called a synchronous electric generator of cumulative compound excitation with brush), particularly for one that it is eco-friendly with capability of being ably self-excited and used as independent motor set or generator set without need of external driving force from locomotors. To realize the eco-friendly object, the present invention, which obviates the consumptive and complicated process in energy conversion instead, adopts natural electromagnetic means to perform the electromechanical energy conversion via special winding configuration by self-excitation, external-excitation and mutual-excitation together with a storage battery cluster and autotransformer to work in synergistic manner. Consequently, via eco-friendly application of the present invention, all the drawbacks and issues come from the conventional power plants such as the electric pylon erecting and relaying transformer substation setting up for remote power transmission and distribution, tremendous consumption of firewood, gasoline, diesel oil, coal or natural gas, treatment issue of nuclear wastes, susceptibility to the decay and aging depreciation losses, riots, wars and natural disasters as well as harmful effects to the environment, human body and community household living and so on can be solved to some extent. Due to synergistic and eco-friendly features of the electric motor-generator tandems, the intelligent cascaded synchronous electric motor-generator tandems of cumulative compound excitation of the present invention can be comprehensively used in vast application range covering: In household, it can be used for supplying power to electric appliances; In manufacturer, it can be used for supplying power to fabricating facilities; In railroad, it can be used for supplying power to electric trains; In navigation, it can be used for supplying power to various vessels; In construction, it can be used for supplying power to various construction machines; In vehicles, it can be used for supplying power to electric braking system and clutch; In engineering, it can be used for supplying power to various equipments and so on.

BACKGROUND OF THE INVENTION

To rotate electric motor need electricity power tapped from external power supply while the external power supply relies on centrally located large-scale power plants or generators. For power plants of thermal power, nuclear energy, wind-power, solar energy and hydroelectric generation, other than wide occupation of land, to deliver the power electricity to every power consuming place via remote electricity transmission and distribution, remotely electric pylon erecting and relaying transformer substation setting up are involved to result in tremendously affecting the inhabiting environmental security. The erection, maintenance, aging depreciation and the decay loss as well as road traffic and environmental hindrance may incur great cost losses and perplex of safety and security. Moreover, the consumption of fossil fuel and radioactive material in thermal power plant and nuclear energy power plant respectively will incur global greenhouse effect caused by the carbon dioxide air pollution and local radioactive pollution from nuclear waste material as well as destruction in natural ecological environment due to fossil fuel exploitation. The power generation of wind-power, solar energy or hydroelectric power plant is always suffered from the uncertainty fluctuation of the climate and weather to fail in normally supplying constant power electricity although it does not same issues as that in the thermal power plant and nuclear energy power plant. For general spare portable generator, which can supply power electricity in flexible mobility, still directly or indirectly consumes natural resources such as firewood or gasoline, diesel oil of fossil fuel. Eventually, it incurs global greenhouse effect caused by the carbon dioxide air pollution too. Consequently, all harmful the issues such as global greenhouse effect caused by the carbon dioxide air pollution, wide occupation of land and so on are inevitable one way or another no matter what type of electric power generation is adopted.

For further detailed explanation, having been confined by the harmful effects to the environment, human body and community household living, the number of the large-scale power plant established is limited by regulations to some extent so that growth rate of the power supply is always inferior to the development in economy with result that the insufficiency of the power supply becomes a pressing issue. For centrally located large-scale thermal and nuclear energy power plants, the tremendous consumption of firewood, gasoline, diesel oil, coal or natural gas is necessary in thermal power plant while nuclear energy power plant unavoidably depletes certain radioactive material in a large amount. For spare independent generator, the necessity in consumption of considerable gasoline, diesel oil is a normal circumstance. For centrally located large-scale power plants of wind-power, solar energy or hydroelectric power plant, which converts natural resources into electric power via electro-mechanic means, the generating power electricity is always subjected to the unstable variation of the weather and climate. From thermo-electromotive viewpoint, the power generating process for those power plants, which consume various energy fuels via multiply complicated conversions to obtain final desired power electricity, inevitably waste much energy during different stages of the process. Additionally, the electric pylon erecting and relaying transformer substation setting up for remote power transmission and distribution for centrally located large-scale plants are susceptible to the decay and aging depreciation losses, riots, wars and natural disasters to blackout or shutdown global or wide-area local power supply so that significant damage are incurred. In addition to the decay and aging depreciation losses in the remote power transmission and distribution, the generating power electricity output by those centrally located large-scale plants is unable to store as provision for spare usage so that all extra power electricity will be wasted out eventually.

Usually, DC motor is primarily to output rotational kinetic energy in simplex manner instead of performing motor function and generator function in duplex manner as the traditional DC motor function and generator function in different way. Specifically, DC motor may be required to perform motor function and generator function in duplex manner via special configuration by an external original motive machine. The prerequisite for the traditional DC motor to perform motor function and generator function in duplex manner is that all the electric machines involved must be compatible in all aspects of specification, which always sacrifices some minor aspects to level trade-off balance in compromising way. Accordingly, some miner armature reactions in a DC electric machine might be augmented to adversely affects overall performance during duplex operation while and might be trivial for overall performance during simplex operation. One armature reaction is the effects of the magnetomotive force (mmf) of the armature on the air-gap field of direct-current (DC), which will affect the armature function and hinder the power output. The other armature reaction is an uneven magnetic flux and magnetic density distribution between the tip front and tip rear for each pole piece (tooth) in the stator that the armature reaction causes a distorted flux-density distribution either to shift the mean magnetism forward or backward. Due to the saturation of the armature pole teeth, the flux density is decreased by a greater amount under one pole tip than it is increased under the other, and therefore the armature reaction produces a demagnetizing effect, grow magnetizing effect and crossover magnetizing effect by the internal uneven field. Thereby, the generated voltage or counter-voltage will be reduced when the armature is loaded unless a pole-face (or compensating) winding or dual-mode winding contrived in the present invention, embedded in slots in the pole face and excited by armature current, is provided to neutralize the armature mmf under the pole faces.

SUMMARY OF THE INVENTION

The primary object of the present invention is to provide an intelligent cascaded synchronous electric motor-generator tandems of cumulative compound excitation, wherein the motor and generator within tandem have common rotor shaft and common stator frame so that once the power source is forwardly supplied to the motor for being converted into mechanical kinetic energy to activating the generator, the electric energy generated by the generator is reversibly fed back to the motor. The intelligent cascaded synchronous electric motor-generator tandems of cumulative compound excitation of the present invention comprises at least a synchronous electric motor-generator tandem with a saddle chassis, a storage battery cluster and an autotransformer as well as at least a ring geared flywheel and a starting booster of DC motor with a mounting rack and a pinion, hereinafter said synchronous electric motor-generator tandem sometimes is called MG tandem for short, wherein each said synchronous electric motor-generator tandem comprises at least a pair of electric motor and electric generator having a common stator with a frame and a common rotor shaft having an armature with a motor winding (coil) for the motor and a generator winding (coil) interlaced respectively within same MG tandem, wherein said motor winding (coil) in the common rotor shaft is served to tap DC power for rotation to supply mechanical torque while said generator winding (coil) in the common rotor shaft is induced to generate power electricity to serve as a power source such that both of said motor winding (coil) and generator winding (coil) rotate in same direction coincidentally as in the same common rotor shaft; Each said electric motor and electric generator, which is respectively mounted on left (front) and right (rear) position of the common rotor shaft in tandem manner to have a stator pole coil winding and a rotor armature coil winding in the electric motor as well as a stator pole coil winding and a rotor armature coil winding in the electric generator respectively, is further respectively equipped a DC commutator and a pair of AC slip ring for individual electric input/output (I/O) function; Thereby, by means of the common rotor shaft of the MG tandem, a DC power, which is output from the DC commutator of the electric generator via the DC commutator of the electric motor, not only can recharge the battery cluster in feedback manner but also can supply to starting booster of DC motor, whereas, an AC power generated from the pair of AC slip ring of the electric generator is output to external loads via autotransformer; Thus, with such special arrangement of the stator pole coil winding with rotor armature coil winding in the electric motor and the stator pole coil winding and rotor armature coil winding via Fleming's left-hand rule and Fleming's right-hand rule as theoretically feasible basis, the electromechanical energy conversion between the conventional motor and generator via electromotive force (emf) or rotational counter-emf and kinetic energy can be effectively achieved by the present invention in synergistic manner; By means of foregoing structure and configuration, the MG tandem can be operated in following procedure that firstly, a shunt DC power form the storage battery cluster is simultaneously supplied to the electric motor of DC motor in the MG tandem and the starting booster respectively so that the rotor shaft is directly driven by the electric motor and indirectly driven by the starting booster via engaged ring geared flywheel to improve the start up operation of the rotor shaft; and secondly, once the start up operation of the rotor shaft is built up to normal rated state, the electric generator is well driven to generate DC output and AC power output such that the DC power output is fed back to storage battery cluster for recharging and to adjacent starting booster for interactive support while the AC power output is transmitted to various external loads via different taps of the autotransformer; In this manner, the MG tandem can be independently used as an enhanced electric motor system or an enhanced electric generator system; Thus, by means of the common rotor shaft in the MG tandem a DC power output from the electric generator can be fed back to the electric motor to keep the synchronous electric motor-generator tandem running while an AC power output from the electric generator can be supplied to external loads; Besides, the storage battery cluster provides a DC starting power to electric motor in addition to supply DC power source to general loads.

The other object of the present invention is to provide an intelligent cascaded synchronous electric motor-generator tandems of cumulative compound excitation as recited above but further comprises a dual mode of MG tandem to solve the harmful armature reaction of uneven magnetic flux and magnetic density distribution happened between the tip front and tip rear for each pole piece (tooth) in the stator in the conventional DC electric machines, wherein each said synchronous electric motor-generator tandem can be arranged in dual mode to comprise two electric motors and two electric generators having a common stator with a frame and a common rotor shaft with an armature such that each said electric motor has an individual stator pole coil winding while each said electric generator has an individual stator pole coil winding respectively for being orderly arranged in interlaced dual mode winding state; The dual mode winding can be further grouped and interlaced in right facing set and left facing set to be specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding as simplex, duplex or multiplex mode symbolically denotes by "S. & . 8" for synergistic operation functionally; Moreover, said dual mode winding can also be arranged and combined into multilayer and helical progressive mode aforesaid as well as be functioned as a pole-face winding (compensating winding) to neutralize the armature mmf under the pole faces; Thus, by means of such dual mode winding with further winding arrangement, in addition to the solution in the harmful armature reaction of uneven magnetic flux and magnetic density distribution happened between the tip front and tip rear for each pole piece (tooth) in the stator in the conventional DC electric machines, the electromechanical energy conversion between the conventional motor and generator via electromotive force (emf) or rotational counter-emf and kinetic energy can be effectively achieved by the present invention in synergistic manner.

The main feature of the present invention is that the intelligent cascaded synchronous electric motor-generator tandems of cumulative compound excitation comprises at least a synchronous electric motor-generator tandem with a saddle chassis, a storage battery cluster and an autotransformer as well as at least a ring geared flywheel and a starting booster of DC motor with a mounting rack and a pinion, hereinafter said synchronous electric motor-generator tandem sometimes is called MG tandem for short, wherein: Each said synchronous electric motor-generator tandem comprises at least a pair of electric motor and electric generator having a common stator with a frame and a common rotor shaft having an armature with a motor winding (coil) for the motor and a generator winding (coil) interlaced respectively within same MG tandem, wherein said motor winding (coil) in the common rotor shaft is served to tap DC power for rotation to supply mechanical torque while said generator winding (coil) in the common rotor shaft is induced to generate power electricity to serve as a power source such that both of said motor winding (coil) and generator winding (coil) rotate in same direction coincidentally as in the same common rotor shaft; Each said electric motor has a stator pole coil winding and a rotor armature coil winding while said electric generator has a stator pole coil winding and a rotor armature coil winding respectively such that the arrangement of each windings in all slots of the rotor shaft armature core are grouped and interlaced in right facing set and left facing set Thereby, by means of the common rotor shaft of the MG tandem, a DC power output from the right (rear) electric generator not only can recharge the battery cluster in feedback manner but also can supply to starting booster of DC motor, whereas, an AC power generated from the electric generator is output to external loads via autotransformer in synergistic operation functionally; When the MG tandem is independently used as an enhanced electric motor system supported by the associated electric generator within same tandem, a DC power, which is output from the associated electric generator, not only can recharge the battery cluster in feedback manner but also can supply to starting booster of DC motor for constantly supporting the normal operation of the electric motor; Likewise, when the MG tandem is independently used as an enhanced electric generator system supported by the associated electric motor within same tandem, the associated electric motor provides a continuous rotational kinetic energy to keep the common rotor shaft in normal smooth rotation so that the electric generator can properly generate electric power; Thus, by means of the common rotor shaft in the MG tandem, a DC power output form the electric generator can be fed back to the electric motor to keep the MG tandem running while an AC power output from the electric generator can be supplied to external loads;

Each said electric motor has a stator pole coil winding and a rotor armature coil winding while said electric generator has a stator pole coil winding and a rotor armature coil winding respectively, via Fleming's left-hand rule and Fleming's right-hand rule as theoretically feasible basis, the arrangement of each windings in all slots of the rotor shaft armature core are grouped and interlaced in right facing set and left facing set to be specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding as simplex, duplex or multiplex mode symbolically denotes by "S. & . 8" for synergistic operation functionally; Thereby, with such special arrangement of the stator pole coil winding with rotor armature coil winding in the electric motor and the stator pole coil winding and rotor armature coil winding, the electromechanical energy conversion between the conventional motor and generator via electromotive force (emf) or rotational counter-emf and kinetic energy can be effectively achieved by the present invention in synergistic manner; Moreover, by means of the common rotor shaft of the MG tandem, a DC power output from the right (rear) electric generator not only can recharge the battery cluster in feedback manner but also can supply to starting booster of DC motor, whereas, an AC power generated from the electric generator is output to external loads via autotransformer in synergistic operation functionally;

In order to have comprehensive versatility for the present invention, the MG tandem adopts multiplicity concept of engineering contrivance: the MG tandems are cascaded in the same common rotor, the common rotor is extendable in accordance with the number of the cascaded MG tandem, the storage batteries are grouped into cluster via flexible series and parallel combination, the autotransformer is configured with multiple output taps, the windings are designed into nested multilayer with interlaced manner, and the number of the independent starting boosters can be increased in accordance with the number of the cascaded MG tandem so that all the components of the present invention are integrated into an intelligent entity to perform in synergistic manner;

In order to preclude overall performance of the MG tandem from shutdown incurred by malfunction due to breakage of any winding, said stator pole coil windings are specially interlaced into parallel winding modes of double-layer of multiple loop or nested multilayer state so that further safety protection is provided in preventing from single MG tandem malfunction due to breakage of anyone winding.

During assembling process, said synchronous electric motor-generator tandem is arranged into a triple cascaded MG tandem set of helical progressive mode including three MG tandems on the common rotor shaft being orderly arranged in overall out of phase angle 90 degree for each quadrant with helical progressive 30 degree increment advancement instead of linear in phase arrangement so that the triple cascaded MG tandem set will leave only one MG tandem in the pole neutral point while other two MG tandems will be deviated from the pole neutral point even in worst case; Thereby, with at least two MG tandems being deviated from the pole neutral point, the triple cascaded MG tandem set can perform smoothly anytime in consequence of no common dead point happened in triple cascaded MG tandem set regarding the relative pole position between rotor and stator.

DC generator of compound wound excitation will consume a large initial inrush current when first turned on that can cause voltage fluctuations and affect the performance of other circuits connected to a common power supply; The surge current drawn by an DC electric motor during a start can be 2 to 10 times the normal operating current, and this can exceed the supply's ratings if not controlled; Because there is no counter-emf in the rotor armature during start of the electric motor, a gear-meshed coupling unit of a ring geared flywheel and a starting booster of DC motor is provided to serve as an automatic soft starter and the performance improver of the present invention; By contrived configuration, said ring geared flywheel is disposed on the exposed section of the rotor shaft of the MG tandem while said starting booster of DC motor with a mounting rack and a pinion is firmly secured on the saddle chassis of the MG tandem such that the pinion of the starting booster is enabled to engage or disengage with the ring geared flywheel in accordance with timely operating condition; By reengineering the automobile self-starter via innovative adaptation, said ring geared flywheel and starting booster are contrived with flexibility in automatic engagement and disengagement mutually; Thus, once the common rotor armature shaft is energized to rotate, the pinion of the starting booster is engaged with the ring geared flywheel so that an emf and a counter-emf are simultaneously induced in the armature of the common rotor armature shaft to generate electric power and counter offset the surge of the inrush current until the synchronous electric motor-generator tandem can run in rated performance, then the pinion of the starting booster is automatically disengaged with the ring geared flywheel;

Said storage battery cluster, which not only connects to the DC commutator of the electric generator for being recharged by the electric generator but also connects to suitable external DC power supply for being recharged by such external DC power supply so that the storage battery cluster can always maintain sufficient stored electricity energy to meet requirement, provides a DC power source to general external loads in addition to supply starting current to electric motor; and Said autotransformer, which connects to the output brush terminals of the electric generator of the MG tandem, serves to regulate the AC voltage output from the electric generator via multiple taps thereon in step-up or step-down manner for supplying various AC voltages to different external loads;

By means of foregoing structure and configuration, the MG tandem can be operated in following procedure that firstly, a shunt DC power form the storage battery cluster is simultaneously supplied to the electric motor of DC motor in the MG tandem and the starting booster respectively so that the rotor shaft is directly driven by the electric motor and indirectly driven by the starting booster via engaged ring geared flywheel to improve the start up operation of the rotor shaft; and secondly, once the start up operation of the rotor shaft is built up to normal rated state, the electric generator is well driven to generate DC output and AC power output such that the DC power output is fed back to storage battery cluster for recharging and to adjacent starting booster for interactive support while the AC power output is transmitted to various external loads via different taps of the autotransformer; In this manner, the MG tandem can be independently used as an enhanced electric motor system or an enhanced electric generator system; Thus, by means of the common rotor shaft in the MG tandem a DC power output from the electric generator can be fed back to the electric motor while an AC power output from the electric generator can be supplied to external loads; Besides, the storage battery cluster provides a DC starting power to electric motor in addition to supply DC power source to general loads.

The technological scheme and technical means are recited as below. The intelligent cascaded synchronous electric motor-generator tandems of cumulative compound excitation of the present invention comprises at least a synchronous electric motor-generator tandem with a saddle chassis, a storage battery cluster and an autotransformer as well as at least a ring geared flywheel and a starting booster of DC motor with a mounting rack and a pinion, hereinafter said synchronous electric motor-generator tandem sometimes is called MG tandem for short, wherein each said synchronous electric motor-generator tandem comprises at least a pair of electric motor and electric generator having a common stator with a frame and a common rotor shaft having an armature with a motor winding (coil) for the motor and a generator winding (coil) interlaced respectively within same MG tandem, wherein said motor winding (coil) in the common rotor shaft is served to tap DC power for rotation to supply mechanical torque while said generator winding (coil) in the common rotor shaft is induced to generate power electricity to serve as a power source such that both of said motor winding (coil) and generator winding (coil) rotate in same direction coincidentally as in the same common rotor shaft; The arrangement of each windings in all slots of the rotor shaft armature core are grouped and interlaced in right facing set and left facing set to be specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding as simplex, duplex or multiplex mode symbolically denotes by "S. & . 8" for synergistic operation functionally; Thus, with such special arrangement of the stator pole coil winding with rotor armature coil winding in the electric motor and the stator pole coil winding and rotor armature coil winding via Fleming's left-hand rule and Fleming's right-hand rule as theoretically feasible basis, the electromechanical energy conversion between the conventional motor and generator via electromotive force (emf) or rotational counter-emf and kinetic energy can be effectively achieved by the present invention in synergistic manner; Besides, the stator pole coil windings are specially interlaced into parallel winding modes of double-layer or multilayer state, further safety protection in preventing from malfunction due to breakage of anyone winding is provided; Moreover, the MG tandem can be independently used as an enhanced electric motor system supported by the associated electric generator within same tandem or an enhanced electric generator system supported by the associated electric motor within same tandem because the electric motor and electric generator are functioned in synergistic tandem; Namely, when the MG tandem is independently used as an enhanced electric motor system, a DC power, which is output from the associated electric generator, not only can recharge the battery cluster in feedback manner but also can supply to starting booster of DC motor for constantly supporting the normal operation of the electric motor; Thus, by means of the common rotor shaft in the MG tandem, a DC power output from the electric generator can be fed back to the electric motor to run the MG tandem while an AC power output from the electric generator can be supplied to external loads; Because there is no counter-emf in the rotor armature during start of the electric motor, a gear-meshed coupling unit of a ring geared flywheel and a starting booster of DC motor is provided to serve as an automatic soft starter and the performance improver of the present invention; By contrived configuration, said ring geared flywheel is disposed on the exposed section of the rotor shaft of the MG tandem while said starting booster of DC motor with a mounting rack and a pinion is firmly secured on the saddle chassis of the MG tandem such that the pinion of the starting booster is enabled to engage or disengage with the ring geared flywheel in accordance with timely operating condition; By reengineering the automobile self-starter via innovative adaptation, said ring geared flywheel and starting booster are contrived with flexibility in automatic engagement and disengagement mutually; Thus, once the common rotor armature shaft is energized to rotate, the pinion of the starting booster is engaged with the ring geared flywheel so that an emf and a counter-emf are simultaneously induced in the armature of the common rotor armature shaft to generate electric power and counter offset the surge of the inrush current until the synchronous electric motor-generator tandem can run in rated performance, then the pinion of the starting booster is automatically disengaged with the ring geared flywheel; Besides, the storage battery cluster provides a DC starting power to electric motor in addition to supply DC power source to general loads, Thus, said storage battery cluster, which provides a DC power source to general loads in addition to supply starting current to electric motor and working DC power supply to the external loads, serves as a DC power reservoir to be recharged by the DC output of the electric generator in the MG tandem; and said autotransformer, which connects to the output brush terminals of the electric generator of the MG tandem, serves to regulate the AC voltage output from the electric generator via multiple taps thereon in step-up or step-down manner for supplying various AC voltages to different external loads;

By means of foregoing structure and configuration, the MG tandem can be operated in following procedure that firstly, a shunt DC power form the storage battery cluster is simultaneously supplied to the electric motor of DC motor in the MG tandem and the starting booster respectively so that the rotor shaft is directly driven by the electric motor and indirectly driven by the starting booster via engaged ring geared flywheel to improve the start up operation of the rotor shaft; and secondly, once the start up operation of the rotor shaft is built up to normal rated state, the electric generator is well driven to generate DC output and AC power output such that the DC power output is fed back to storage battery cluster for recharging and to adjacent starting booster for interactive support while the AC power output is transmitted to various external loads via different taps of the autotransformer; In this manner, the MG tandem can be independently used as an enhanced electric motor system or an enhanced electric generator system; Thus, by means of the common rotor shaft in the MG tandem a DC power output from the electric generator can be fed back to the electric motor to keep the synchronous electric motor-generator tandem running while an AC power output from the electric generator can be supplied to external loads; Besides, the storage battery cluster provides a DC starting power to electric motor in addition to supply DC power source to general loads.

Wherein, each said synchronous electric motor-generator tandem comprises at least a pair of electric motor and electric generator having a common stator with a stator wings (coil) and a common rotor shaft having an armature with a motor winding (coil) for the motor and a generator winding (coil) interlaced respectively within same MG tandem, said common stator and common rotor shaft are made of ferromagnetic material; Said stator wings (coil) of the common stator are grouped and interlaced in right facing set and left facing set to be specially configured by equivalent distance combination of duplicated manner so that the electromechanical energy conversion between the conventional motor and generator via electromotive force (emf) or rotational counter-emf and kinetic energy can be effectively achieved by the present invention in synergistic manner by theoretically feasible basis of Fleming's left-hand rule and Fleming's right-hand rule; and said stator wings (coil) of right facing set and left facing set are configured in nested multilayer manner that each main winding is disposed in outmost enveloping layer, a pair of middle windings are embedded in the main winding layer, and each middle winding contains a single series winding, a shunt excitation and a cumulative compound winding respectively; Thereby, double cumulative compound windings are interlaced to work in synergistic manner.

Wherein, each said electric motor and electric generator, which is respectively mounted on left (front) and right (rear) position of the common rotor shaft in tandem manner to have a stator pole coil winding and a rotor armature coil winding in the electric motor as well as a stator pole coil winding and a rotor armature coil winding in the electric generator respectively, is further respectively equipped a DC commutator and a pair of AC slip ring for individual electric input/output (I/O) function; wherein each said rotor armature coil winding in the electric motor and rotor armature coil winding in the electric generator are specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding to meet specific tandem requirement; Thereby, by means of the common rotor shaft of the MG tandem, a DC power, which is output from the DC commutator of the electric generator via the DC commutator of the electric motor, not only can recharge the battery cluster in feedback manner but also can supply to starting booster of DC motor, whereas, an AC power generated from the pair of AC slip ring of the electric generator is output to external loads via auto transformer.

Wherein, said synchronous electric motor-generator tandem is arranged into a triple cascaded MG tandem set of helical progressive mode including three MG tandems on the common rotor shaft being orderly arranged in overall out of phase angle 90 degree for each quadrant with helical progressive 30 degree increment advancement instead of linear in phase arrangement so that the triple cascaded MG tandem set will leave only one MG tandem in the pole neutral point while other two MG tandems will be deviated from the pole neutral point even in worst case; Thereby, with at least two MG tandems being deviated from the pole neutral point, the triple cascaded MG tandem set can perform smoothly anytime in consequence of no common dead point happened in triple cascaded MG tandem set regarding the relative pole position between rotor and stator.

Wherein, each said synchronous electric motor-generator tandem can be arranged in dual mode to comprise two electric motors and two electric generators having a common stator with a frame and a common rotor shaft with an armature such that each said electric motor has an individual stator pole coil winding while each said electric generator has an individual stator pole coil winding respectively for being orderly arranged in interlaced dual mode winding state; Moreover, said dual mode winding can also be arranged and combined into multilayer and helical progressive mode aforesaid as well as be functioned as a pole-face winding (compensating winding) to neutralize the armature mmf under the pole faces in solving harmful armature reaction of uneven magnetic flux and magnetic density distribution among pole tips.

Wherein, said stator pole coil windings are specially interlaced into parallel winding modes of double-layer of multiple loop or nested multilayer state so that further safety protection is provided in preventing from single MG tandem malfunction due to breakage of anyone winding.

Wherein, each single storage battery in the storage battery cluster further comprises a set of battery anode-cathode terminals including at least a negative electrode (anode) terminals and at least a positive electrode (cathode) terminals that are in contact with an electrolyte solution so that each negative electrode (anode) terminal and positive electrode (cathode) terminal are properly connected to corresponding suitable DC commutator of the individual electric motor and electric generator respectively in the synchronous electric motor-generator tandem to avoid reversing against each other during recharging sequence; Moreover, the set battery anode-cathode terminals of negative electrode terminals and positive electrode terminals enable the single storage battery for being recharged by suitable external DC power supply.

In conclusion the disclosure heretofore, the features and effects of the present invention are recapitulated as followings.

1. The electric motor 12 in the synchronous electric motor-generator tandems of the present invention can be energized by self-excitation, external-excitation or mutual-excitation via interactive coupling of the electromagnetic reaction and the reiteration of cumulative compound excitation to enhance the exciting effect. Thereby, if the MG tandem is used as an enhanced electric motor 12 system supported by the associated electric generator 13 within same tandem, a DC power, which is output from the DC commutator 160 of the associated electric generator 13, not only can recharge the battery cluster 20 in feedback manner but also can supply to starting booster 401 of DC motor for constantly supporting the normal operation of the electric motor 12 in enhanced manner.

2. The stator field windings are grouped in right facing set of generators B, D and left facing set of motors A, C such that both sets are interlaced into nested multilayer to comply with the combination of Fleming's left-hand rule and Fleming's right-hand rule (as shown in FIGS. 5 and 6). For each main winding of A, C of left facing set is further configured to comprise three single secondary windings that a "shunt winding A and shunt winding C" in double layer manner, a "series winding A and series winding C" in double layer manner and a "simple compound winding A and simple compound winding C" together with "cumulative compound winding A and cumulative compound winding C" in double layer manner. Likewise, for each main winding of B, D of right facing set is further configured to comprise three single secondary windings that a "shunt winding B and shunt winding D" in double layer manner, a "series winding B and series winding D" in double layer manner and a "simple compound winding B and simple compound winding D" together with "cumulative compound winding B and cumulative compound winding D" in double layer manner. The rotor field windings are also grouped in right facing set of generators B, D and left facing set of motors A, C such that both sets are interlaced into nested multilayer with combination of external excitation winding, shunt excitation winding and series excitation winding. Accordingly, each rotor main wind of A, C and B, D is configured into a single set that comprises a single series winding, a single shunt winding and a combination of simple compound winding with cumulative compound winding, or a double set of two single sets to have self-excitation winding, external excitation winding and mutual excitation winding. Thus, with both Fleming's hand rules as a solid ground for practical feasibility of the present invention, by means of such winding configuration, the electromechanical energy conversion between the conventional motor and generator via electromotive force (emf) or rotational counter-emf and kinetic energy can be effectively achieved by the present invention in synergistic manner.

3. The capacity of every slot in the stator frame core is augmented to accommodate dual mode windings of grouped main windings A, C and grouped main windings B, D. Both grouped windings A, C and B, D are further configured into orderly interlaced opposed facing manner comprising series excitation winding, shunt excitation winding and cumulative compound excitation winding to function as a pole-face winding (compensating winding) to neutralize the armature mmf under the pole faces in solving harmful armature reaction of uneven magnetic flux and magnetic density distribution among pole tips.

4. Via Fleming's left-hand rule and Fleming's right-hand rule as theoretically feasible basis, the arrangement of each windings in all slots of the rotor shaft armature core are grouped and interlaced in right facing set and left facing set to be specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding as simplex, duplex or multiplex mode for synergistic operation functionally; Thereby, with such special arrangement of the stator pole coil winding with rotor armature coil winding in the electric motor and the stator pole coil winding and rotor armature coil winding, the electromechanical energy conversion between the conventional motor and generator via electromotive force (emf) or rotational counter-emf and kinetic energy can be effectively achieved by the present invention in synergistic manner.

5. The stator pole coil windings are specially interlaced into parallel winding modes of double-layer of multiple loop or nested multilayer state so that further safety protection is provided in preventing from single MG tandem malfunction due to breakage of anyone winding (as shown in FIG. 4).

6. The synchronous electric motor-generator tandem is arranged into a triple cascaded MG tandem set of helical progressive mode including three MG tandems on the common rotor shaft being orderly arranged in overall out of phase angle 90 degree for each quadrant with helical progressive 30 degree increment advancement instead of linear in phase arrangement so that the triple cascaded MG tandem set will leave only one MG tandem in the pole neutral point while other two MG tandems will be deviated from the pole neutral point even in worst case (as shown in FIG. 9); Thereby, with at least two MG tandems being deviated from the pole neutral point, the triple cascaded MG tandem set can perform smoothly anytime in consequence of no common dead point happened in triple cascaded MG tandem set regarding the relative pole position between rotor and stator.

7. The engineering concept of the present invention is to replace conventional centralized large-scale power plant by the intelligent cascaded synchronous electric motor-generator tandems of cumulative compound excitation of the present invention. In order to have comprehensive versatility for the present invention, the MG tandem adopts multiplicity concept of engineering contrivance: the MG tandems are cascaded in the same common rotor, the common rotor is extendable in accordance with the number of the cascaded MG tandem, the storage batteries are grouped into cluster via flexible series and parallel combination, the autotransformer is configured with multiple output taps, the windings are designed into nested multilayer with interlaced manner, and the number of the independent starting boosters can be increased in accordance with the number of the cascaded MG tandem so that all the components of the present invention are integrated into an intelligent entity to perform in synergistic manner. Besides, the storage battery cluster, which not only connects to the DC commutator of the electric generator for being recharged by the electric generator but also connects to suitable external DC power supply for being recharged by such external DC power supply so that the storage battery cluster can always maintain sufficient stored electricity energy to meet requirement, provides a DC power source to general external loads in addition to supply starting current to electric motor.

Besides, due to synergistic feature of the electric motor-generator tandems, the intelligent cascaded synchronous electric motor-generator tandems of cumulative compound excitation of the present invention can be comprehensively used in most kinds of vessels and submarines. Typical application of the present invention is preferably described in the Taiwan Patent No. 1265127 in title of "vessel carrier with adjustable foils and swing fins" and U.S. Pat. No. 7,287,480 in title of "Nautical transport vehicle having enhanced stability", both of which are owned by the inventor (applicant) of the present invention. Please refer to views a, b shown in FIG. 14. The single synchronous electric motor-generator tandem 10 with saddle chassis of the present invention is installed on the multilayer rack 110 of the "vessel carrier with adjustable foils and swing fins" in hung manner, wherein said synchronous electric motor-generator tandem 10 supplies power to the distributed hydro-jets 100 of the vessel carrier; each said distributed hydro-jets 100 functions as turbo-engine in the jet aircraft; said multilayer rack 110, which is a versatile combination of stacked racks, whose layer number of stacked racks is determined by the draft (draught) depth of the vessel carrier in order to have optimal sailing state, function as pylon for the synchronous electric motor-generator tandem 10; said adjustable foils function as horizontal stabilizers in the aircraft or sailplanes in the submarine; and each said swing fin functions as rudder in the aircraft or vessel but is enabled to swing for following the flow direction of the water so as to enhance the stability in smooth manner or manipulated to assist the steering of the vessel carrier. With synchronous electric motor-generator tandem 10 installation to flexibly supply stable and constant power to the distributed hydro-jets 100, the vessel carrier can not only have much more power to drive in higher speed but also have stable and balanced sailing state due to even distributed driving power from the distributed hydro-jets 100. By replacing the intelligent cascaded synchronous electric motor-generator tandems and distributed hydro-jets 100 for conventional centralized diesel engine power supply and propeller at the rear outboard, other than the miscellaneous maintenance cost can be considerably saved, not only the low speed limit can be overcome but also the risk in shutdown can be precluded to have safety protection at oceanic sailing.

Regarding the practical application range for the intelligent cascaded synchronous electric motor-generator tandems of cumulative compound excitation of the present invention, some key application fields are listed below: In household, it can be used for supplying power to electric appliances; In manufacturer, it can be used for supplying power to fabricating facilities; In railroad, it can be used for supplying power to electric trains; In navigation, it can be used for supplying power to various vessels; In construction, it can be used for supplying power to various construction machines; In vehicles, it can be used for supplying power to electric braking system and clutch; and in engineering, it can be used for supplying power to various equipments. Therefore, via application of the present invention, all the drawbacks and issues come from the conventional power plants such as the electric pylon erecting and relaying transformer substation setting up for remote power transmission and distribution, tremendous consumption of firewood, gasoline, diesel oil, coal or natural gas, treatment issue of nuclear wastes, susceptibility to the decay and aging depreciation losses, riots, wars and natural disasters as well as harmful effects to the environment, human body and community household living and so on can be solved to some extent.

DETAILED DESCRIPTION OF THE PREFERRED EMBODIMENTS

For the purpose of achieving the objects and functions, the well-known principles in relationship and electromechanical energy conversion between the conventional motor and generator via electromotive force (emf) and kinetic energy are adopted and applied here. Namely, the power source is forwardly supplied to the motor for being converted into mechanical kinetic energy to activating the generator while the mechanical kinetic energy obtained by the generator is reversibly converted into electric energy. Accordingly, by means of foregoing principles in relationship and energy conversion between the conventional motor and generator together with the rule for cause and effect, a simple effective contrivance and scheme is originally innovated a constantly reiterating duplex close-looped energy conversion system by the present invention for industrial practical usage. The technological means and implementation of the present invention will be described by a preferred exemplary embodiment with associated drawings as below.

Figure 1:
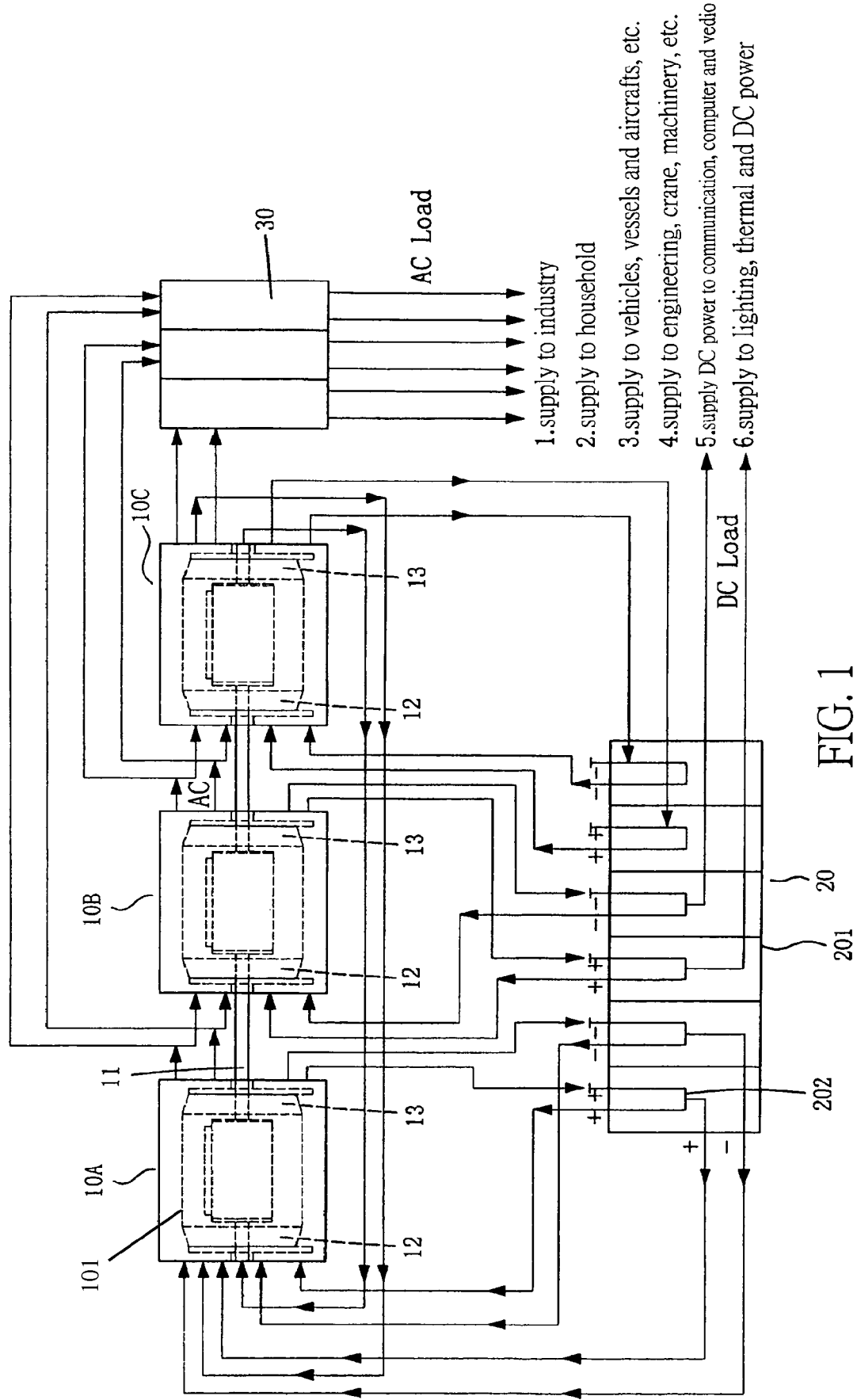
FIG. 1 is a schematic view showing configuration for an exemplary embodiment of the "intelligent cascaded synchronous electric motor-generator tandems of cumulative compound excitation" in the present invention.
Figure 2:
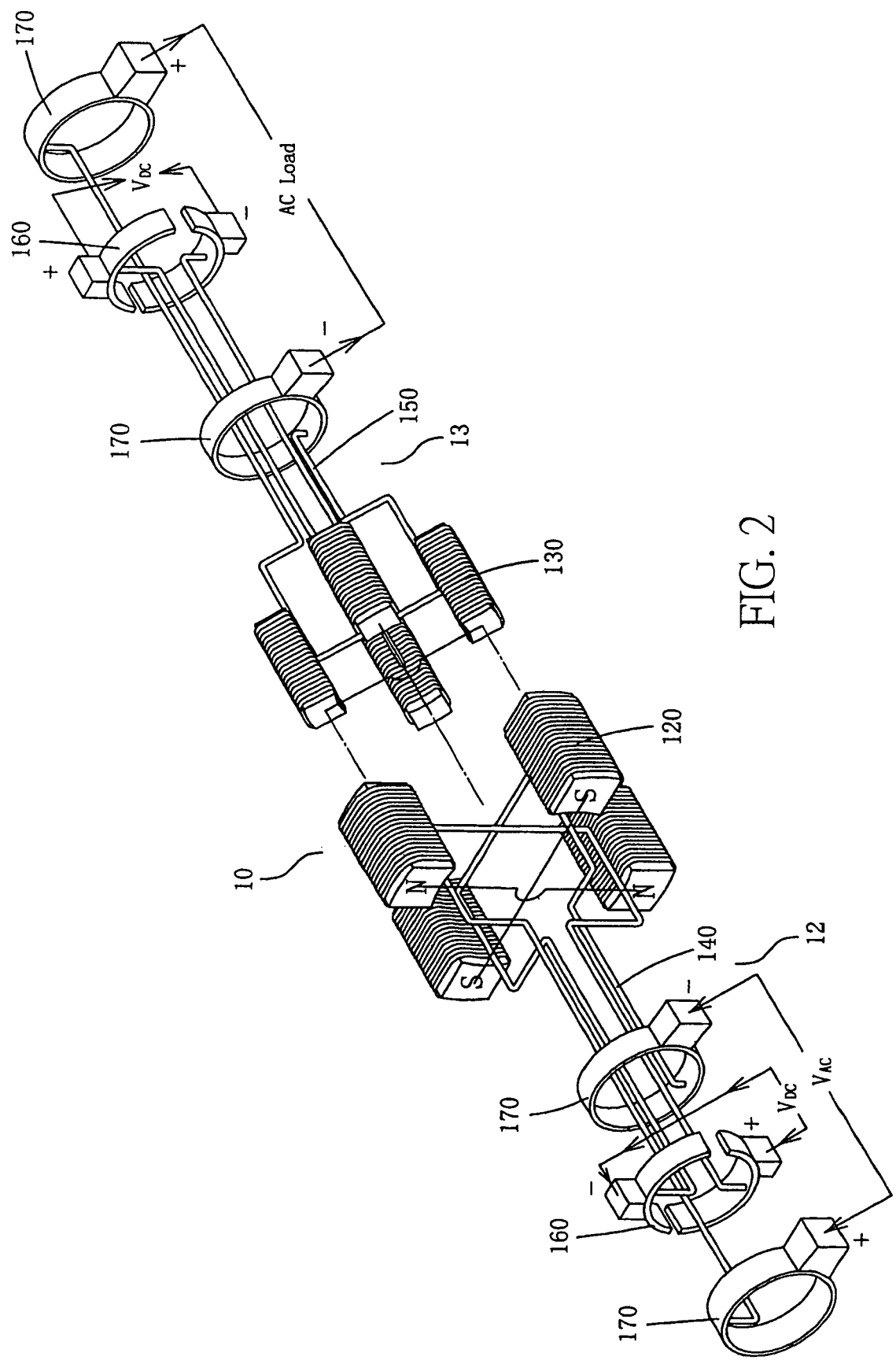
FIG. 2 is an exploded perspective view showing an exemplary embodiment for a single "synchronous electric motor-generator tandem" of the present invention.
Figure 3:
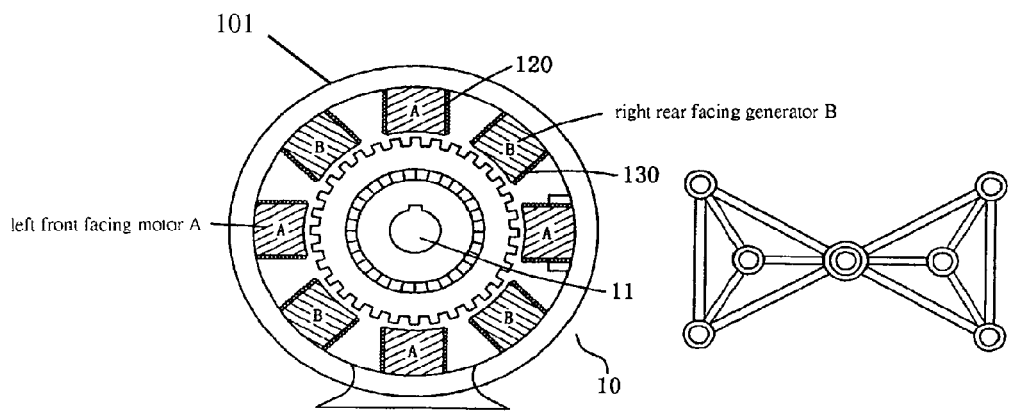
FIG. 3 is a planar cross section and symbolic view showing primary field winding of the common stator for precedent left motor A and subsequent right generator B respectively for an exemplary embodiment of a single "synchronous electric motor-generator tandem" in the present invention.
Figure 4:
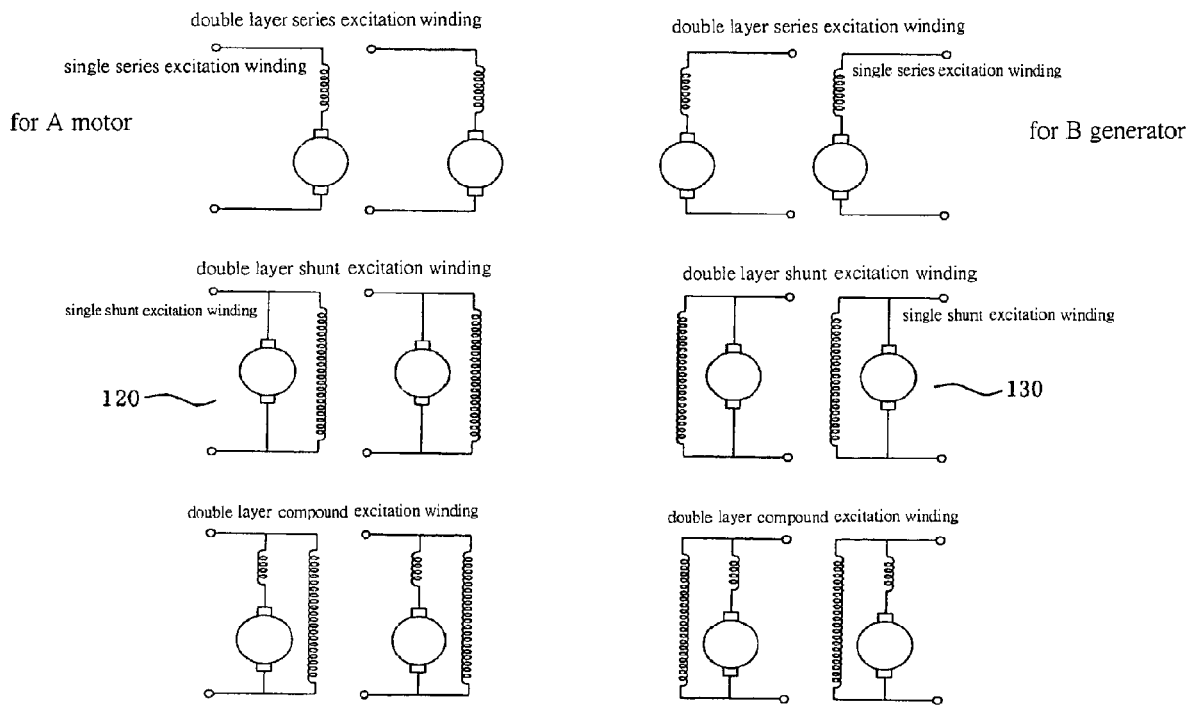
FIG. 4 is a referential circuit schematic view showing double layer shunt-wound excitation, double layer series-wound excitation and double layer compound-wound excitation of the stator primary field winding for precedent left motor A and subsequent right generator B respectively for an exemplary embodiment of a single "synchronous electric motor-generator tandem" in the present invention.
Figure 7:
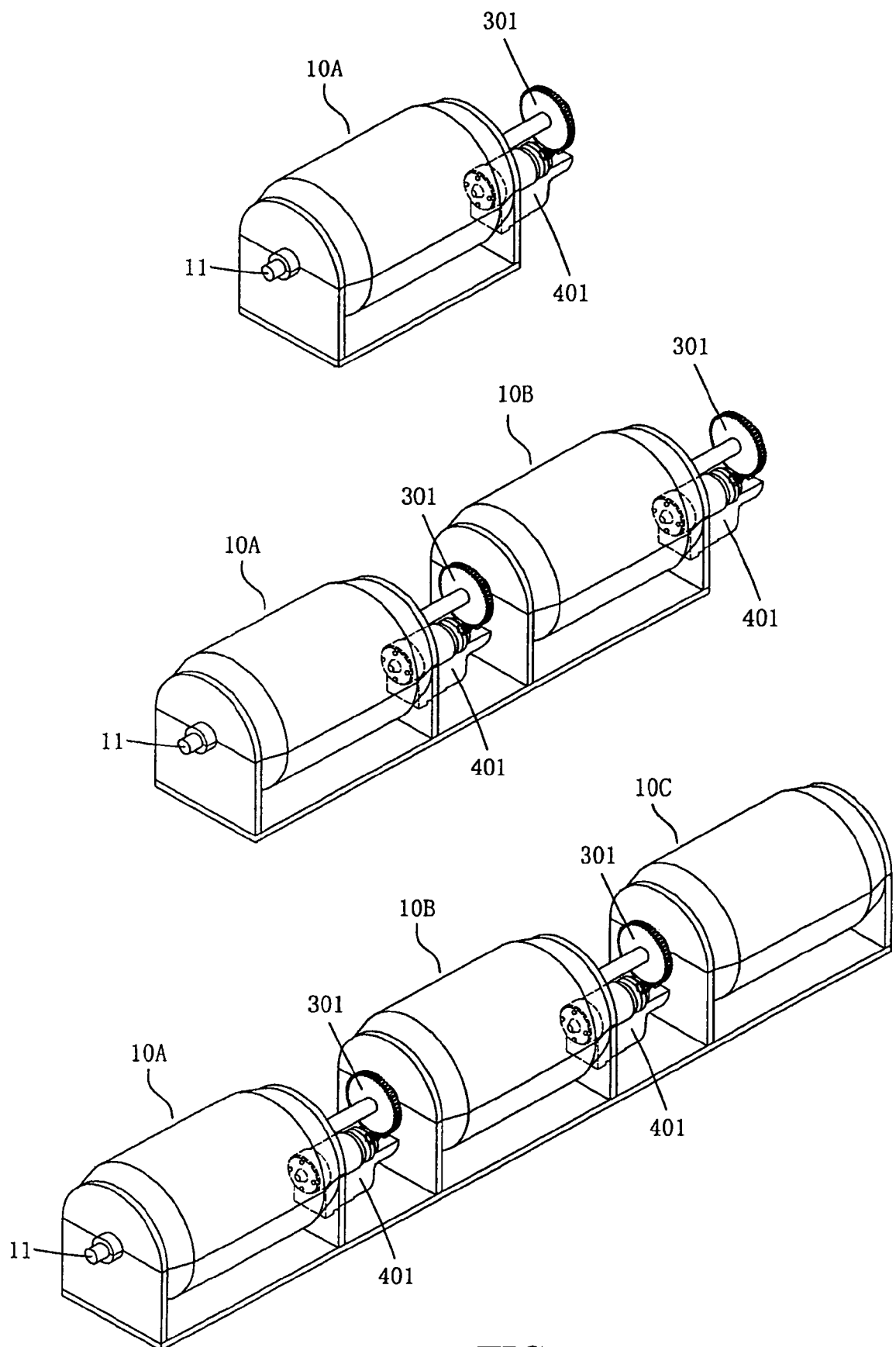
FIG. 7 is a perspective view showing individual exemplary embodiment for each assembly of a single set, two cascaded sets and three cascaded sets of "synchronous electric motor-generator tandem" respectively in the present invention.
Figure 8:
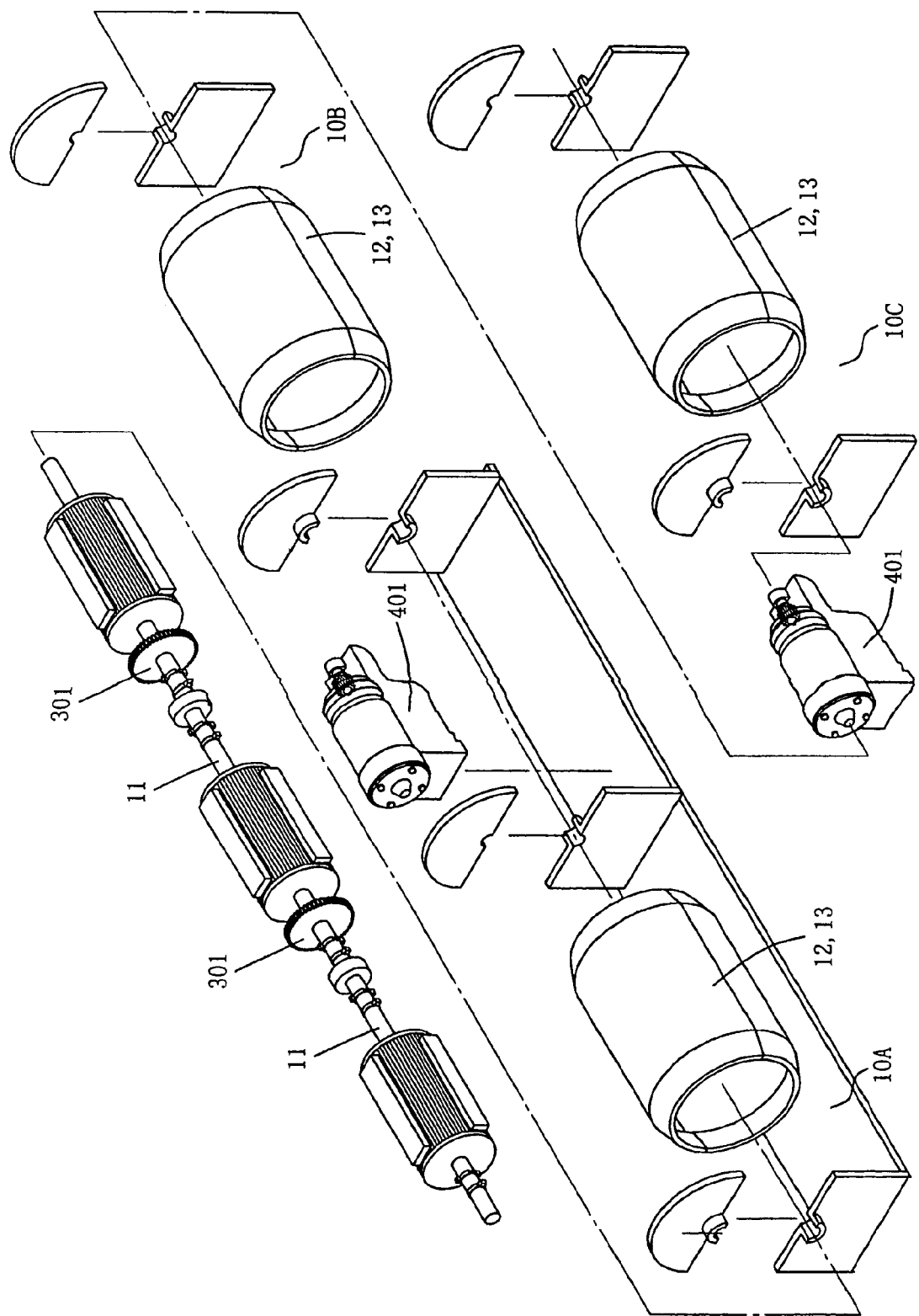
FIG. 8 is an exploded perspective view showing individual exemplary embodiment for three cascaded sets of "synchronous electric motor-generator tandem" in the present invention as shown in previous FIG. 7.
Figure 9:
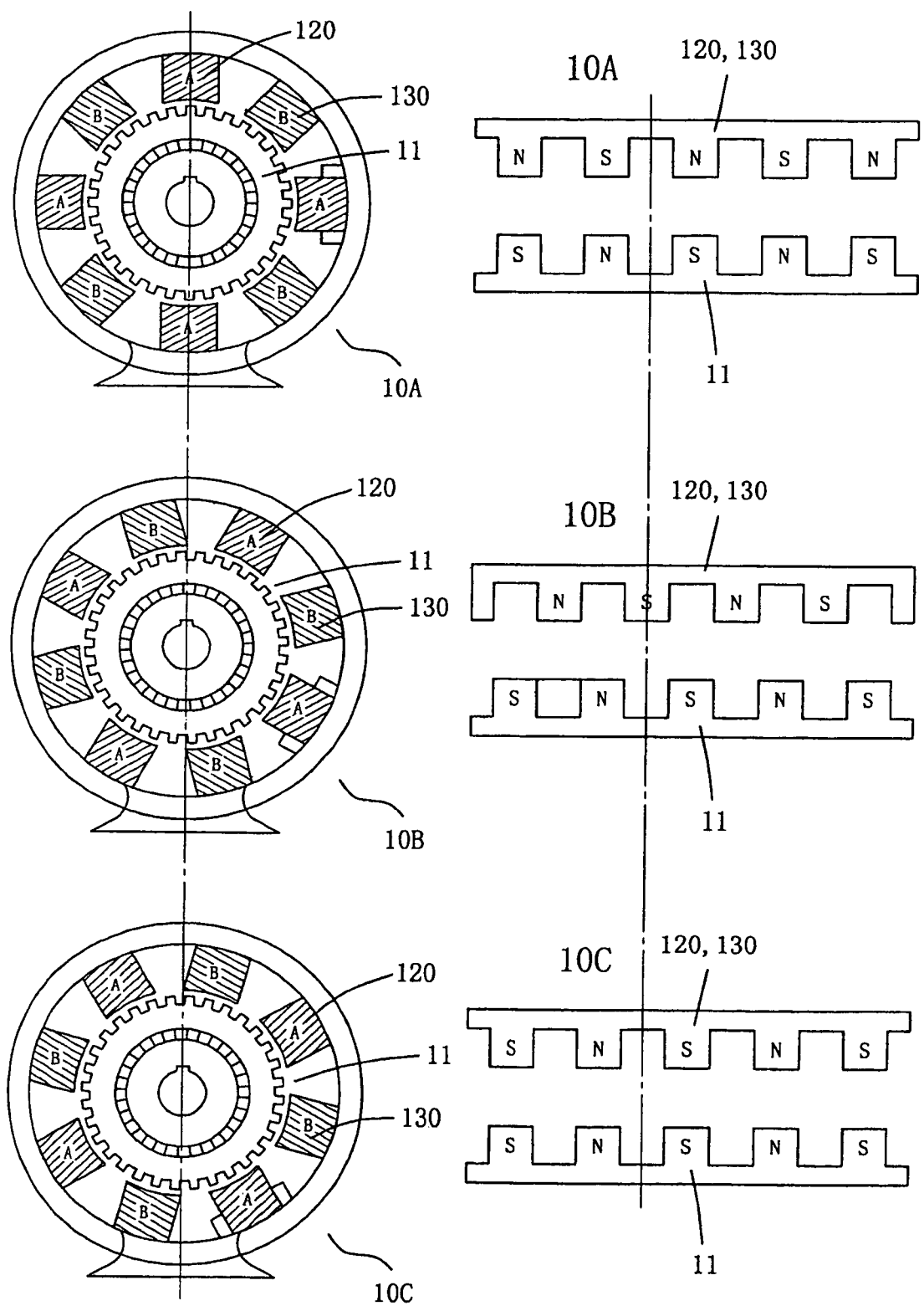
FIG. 9 is an exploded perspective view showing individual exemplary embodiment for three cascaded sets of "synchronous electric motor-generator tandem", whose rotor armatures are orderly arranged in overall out of phase angle 90 degree for each quadrant with helical progressive 30 degree increment advancement in the present invention.
Figure 11:
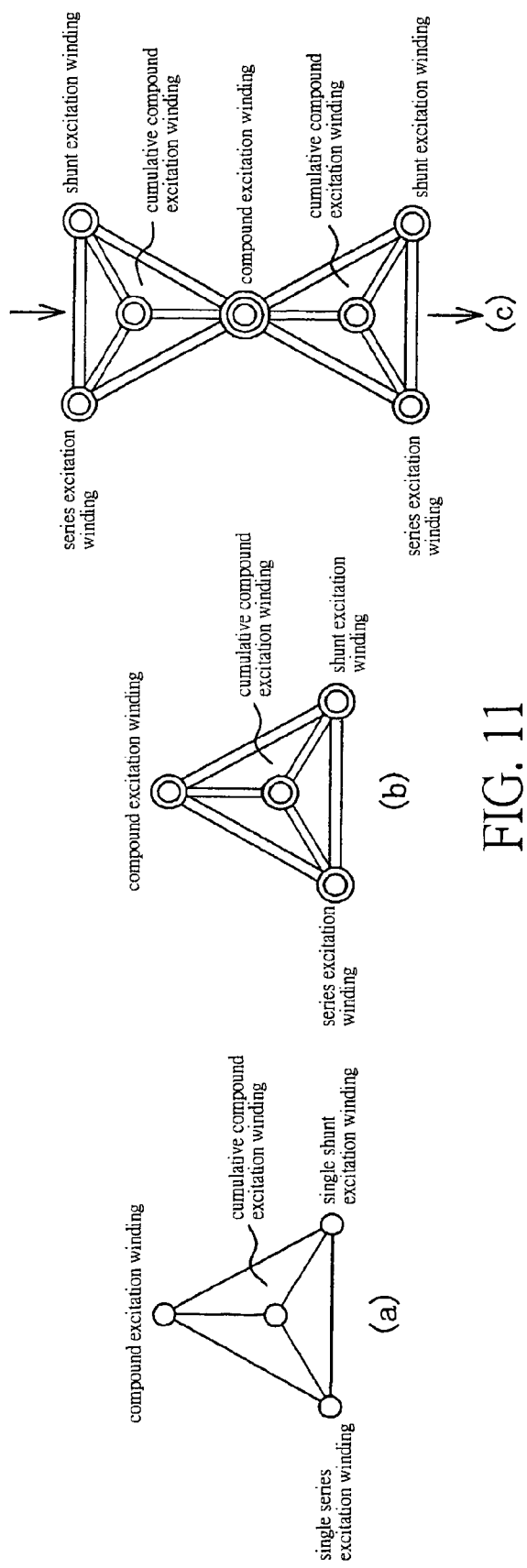
FIG. 11 is a set of three schematic diagrams showing the interrelationship among electric energy, magnetic energy and mechanical energy via special winding configuration of the present invention that each windings in the rotor shaft armature core are grouped and interlaced in right facing set and left facing set to be specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding as simplex, duplex or multiplex mode symbolically denotes by "S. & . 8" for synergistic operation functionally.
Figure 12:
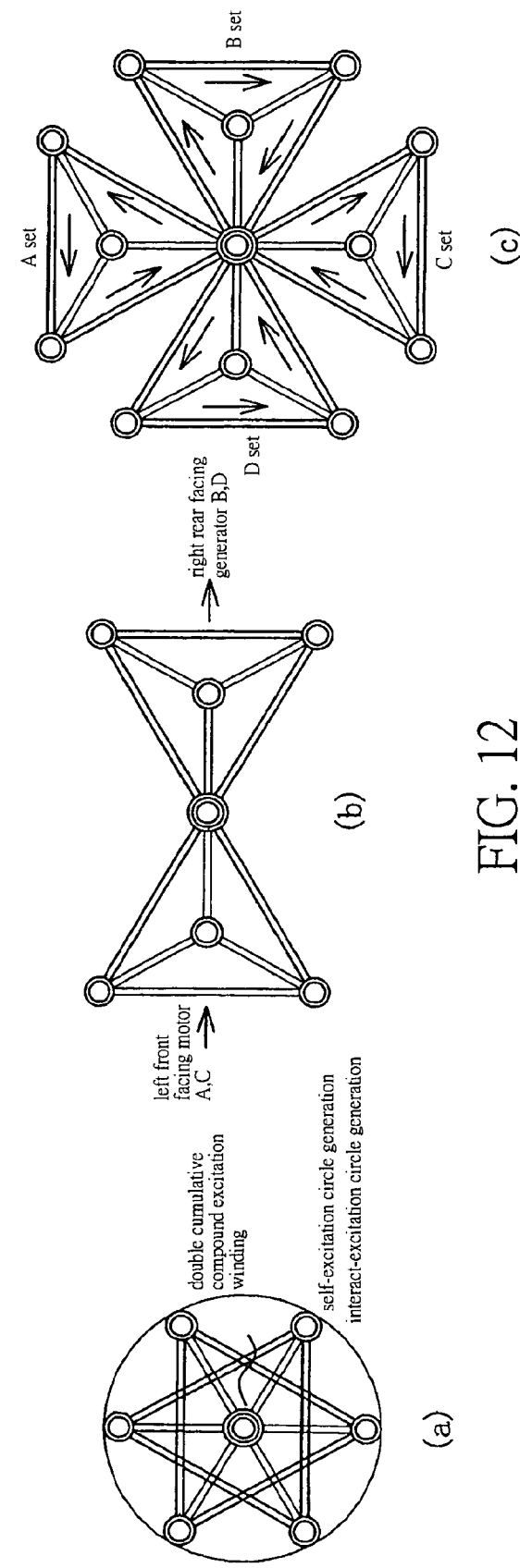
FIG. 12 is a set of three schematic diagrams showing the realization of Fleming's left-hand rule and Fleming's right-hand rule via special winding configuration of the present invention that each windings in the rotor shaft armature core are grouped and interlaced in right facing set and left facing set to be specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding as simplex, duplex or multiplex mode symbolically denotes by "S. & . 8" for synergistic operation functionally.
Figure 13:
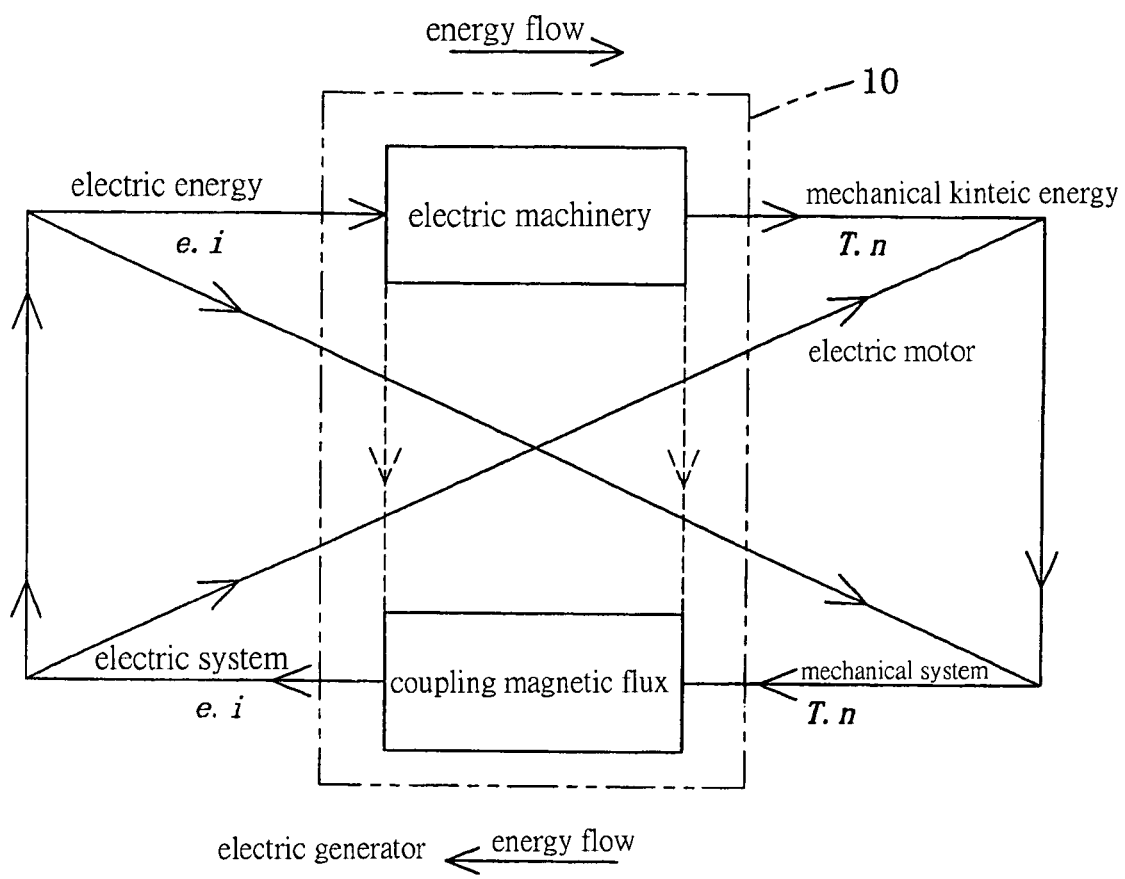
FIG. 13 is a schematic diagram showing the relationship and means for electromechanical conversion between the motor and the generator within same "synchronous electric motor-generator tandem" to work in synergistic manner via mutual magnetic field and flux in the common rotor armature and common stator.
Figure 14:
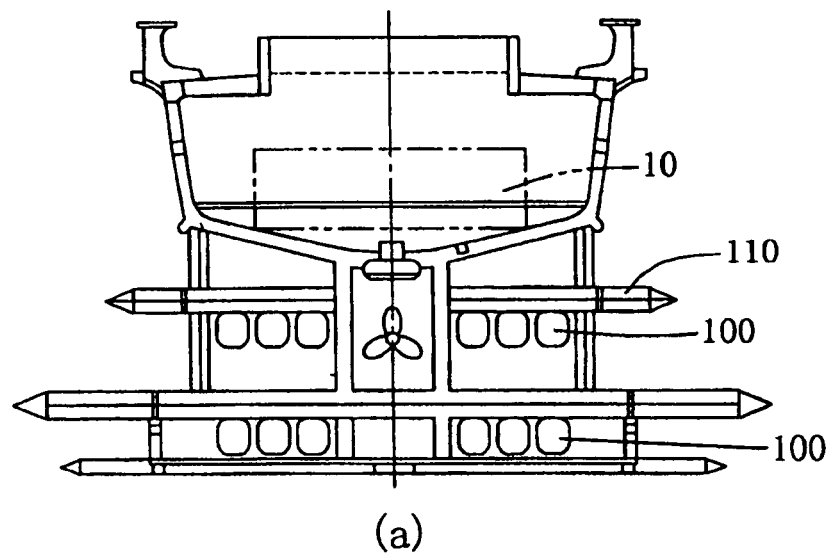
FIG. 14 is an application view as an exemplary embodiment of the present invention showing the installation of the "synchronous electric motor-generator tandem" a "vessel carrier with adjustable foils and swing fins" for illustrating the versatile and synergistic features of the present invention.
Figure 14:
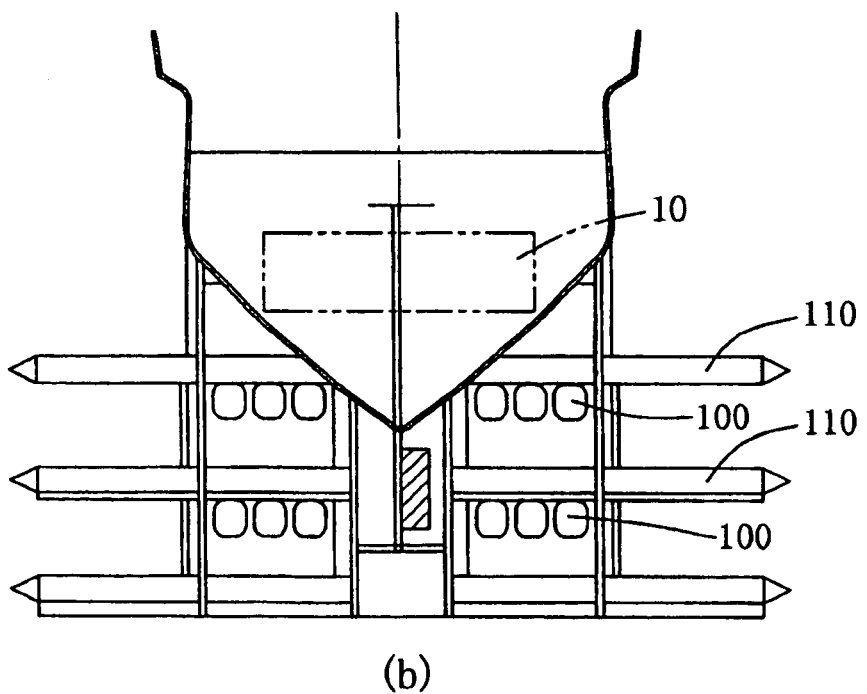

Please refer to FIGS. 1, 2 and 7. The "intelligent cascaded synchronous electric motor-generator tandems of cumulative compound excitation" of the present invention comprises at least a synchronous electric motor-generator tandem 10 with a saddle chassis, a storage battery cluster 20 and an autotransformer 30 as well as at least a ring geared flywheel 301 and a starting booster 401 of DC motor with a mounting rack and a pinion, hereinafter said synchronous electric motor-generator tandem sometimes is called "MG tandem" for short, wherein:

Each said synchronous electric motor-generator tandem 10, which can be arranged into simple set including single MG tandem 10A (as view a shown in FIG. 7), dual cascaded set including MG tandem 10A with MG tandem 10B (as view b shown in FIG. 7) and triple cascaded set including MG tandem 10A, MG tandem 10B and MG tandem 10C (as view c shown in FIG. 7), comprises at least a pair of electric motor 12 and electric generator 13 having a common stator 101 with a frame and a common rotor shaft 11 having an armature with a motor winding (coil) for the motor and a generator winding (coil) interlaced respectively within same MG tandem 10, wherein:

said motor winding (coil) in the common (rotor shaft 11) is served to tap DC power for rotation to supply mechanical torque while said generator winding (coil) in the common (rotor shaft 11) is induced to generate power electricity to serve as a power source such that both of said motor winding (coil) and generator winding (coil) rotate in same direction coincidentally as in the same common (rotor shaft 11);

Each said electric motor 12 and electric generator 13, which is respectively mounted on left (front) and right (rear) position of the common rotor shaft 11 in tandem manner, respectively equipped a DC commutator 160 and a pair of AC slip ring 170 for individual electric input/output (I/O) function (as shown in FIG. 2);

Besides, said electric motor 12 has a stator pole coil winding 120 and a rotor armature coil winding 140 while said electric generator 13 has a stator pole coil winding 130 and a rotor armature coil winding 150 respectively; Normally, windings can be classified in two groups: armature windings and field windings. The armature winding is the main current-carrying winding in which the electromotive force (emf) or rotational counter-emf is induced. The current in the armature winding is known as the armature current. The field winding produces the magnetic field in the machine. The current in the field winding is known as the field current or exciting current. Since said electric motor 12 and electric generator 13 have a common stator 101 with frame and a common rotor shaft 11 with armature in the present invention, the rotor armature coil windings 140 and 150 are specially configured by versatile combination of Simple Lap Winding (SLW), Double Lap Winding (DLW), Simple Wave Winding (SWW) and Multiple Wave Winding (MWW) in association with series excitation winding, shunt excitation winding and cumulative compound excitation winding to meet specific tandem requirement as shown in FIG. 2, namely the arrangement of each winding 140 and winding 150 in all slots of the rotor shaft 11 armature core are grouped in right facing set and left facing set and interlaced into nested multilayer of simplex, duplex or multiplex mode, symbolically denotes as "S. & . 8" (as view c shown in FIG. 11 as well as views b and c shown in FIG. 12), to mutually induce each other for better electromagnetic reaction (as shown in FIG. 4); Thereby, by means of the common rotor shaft 11 of the MG tandem 10, a DC power, which is output from the DC commutator 160 of the right (rear) electric generator 13 via the DC commutator 160 of the left (front) electric motor 12, not only can recharge the battery cluster 20 in feedback manner but also can supply to starting booster 401 of DC motor, whereas, an AC power generated from the pair of AC slip ring 170 of the right (rear) electric generator 13 is output to external loads via autotransformer 30;

As mentioned above, since said electric motor 12 and electric generator 13 have a common stator 101 with a frame and a common rotor shaft 11 with an armature in the present invention, other than being interlaced each other, the stator pole coil windings 120 and 130 are specially configured to meet specific tandem requirement as shown in FIG. 3, namely the capacity for all slots in the frame of the stator 101 is enlarged to contain more windings so that the arrangement of each pair of different facing winding 120 and winding 130 in all slots of the stator 101 are interlaced into various winding modes of double-layer or multilayer state (as shown in FIG. 4); In this exemplary embodiment, each winding 120 or winding 130 contains two main windings in double-layer stack such that each main winding further nests either a single series excitation winding, a single shunt excitation winding and a single compound excitation winding or combination of the single series excitation winding, single shunt excitation winding and single compound excitation winding as double cumulative compound excitation windings; Thereby, by means of multiple series-parallel arrangement, each winding 120 or winding 130 in all slots of the stator 101 are interlaced into multilayer of simplex, duplex or multiplex mode, symbolically denotes as "S. & . 8" (as shown in FIGS. 11 and 12); Thus, the electromechanical energy conversion between the conventional motor and generator via electromotive force (emf) or rotational counter-emf and kinetic energy can be effectively achieved by the present invention in synergetic manner (as shown in FIG. 11); Theoretically, Fleming's left-hand rule demonstrates the principle of electric motor while Fleming's right-hand rule demonstrates the principle of electric generator; Thus, with both Fleming's hand rules as a solid ground for practical feasibility of the present invention, by means of such winding configuration, the electromechanical energy conversion between the conventional motor and generator via electromotive force (emf) or rotational counter-emf and kinetic energy can be effectively achieved by the present invention in synergistic manner; Besides, the stator pole coil windings 120 and 130 are specially interlaced into parallel winding modes of double-layer or multilayer state, further safety protection in preventing from malfunction due to breakage of anyone winding is provided;

Moreover, the "synchronous electric motor-generator tandems" in the present invention can be independently used as an enhanced electric motor 12 system supported by the associated electric generator 13 within same tandem or an enhanced electric generator 13 system supported by the associated electric motor 12 within same tandem because the electric motor 12 and electric generator 13 are functioned in synergistic tandem; Namely, when the "synchronous electric motor-generator tandems" in the present invention is independently used as an enhanced electric motor 12 system, a DC power, which is output from the DC commutator 160 of the associated electric generator 13, not only can recharge the battery cluster 20 in feedback manner but also can supply to starting booster 401 of DC motor for constantly supporting the normal operation of the electric motor 12; Thus, by means of the common rotor shaft 11 in the synchronous electric motor-generator tandem 10 and individual commutator 160 and pair AC slip rings 170 for the electric motor 12 and electric generator 13 respectively, a DC power output from the DC commutator 160 of the electric generator 13 can be fed back to the DC commutator 160 of the electric motor 12 to keep the synchronous electric motor-generator tandem 10 running while an AC power output from the pair AC slip rings 170 of the electric generator 13 can be supplied to external loads;

As shown in FIGS. 7 and 8, each said synchronous electric motor-generator tandem 10 can be arranged into simple set, dual cascaded set and triple cascaded set such as a triple cascaded MG tandem set of helical progressive mode including MG tandem 10A, MG tandem 10B and MG tandem 10C as shown in FIG. 9, wherein each individual rotor armature of MG tandem 10A, MG tandem 10B and MG tandem 10C on the common rotor shaft 11 are orderly arranged in overall out of phase angle 90 degree for each quadrant with helical progressive 30 degree increment advancement instead of linear in phase arrangement so that the triple cascaded MG tandem set will leave only one MG tandem in the pole neutral point while other two MG tandems will be deviated from the pole neutral point even in worst case; Thereby, with at least two MG tandems being deviated from the pole neutral point, the triple cascaded MG tandem set can perform smoothly anytime in consequence of no common dead point happened in triple cascaded MG tandem set regarding the relative pole position between rotor and stator; DC generator of compound wound excitation will consume a large initial inrush current when first turned on that can cause voltage fluctuations and affect the performance of other circuits connected to a common power supply; The surge current drawn by an electric motor during a start can be 2 to 10 times the normal operating current, and this can exceed the supply's ratings if not controlled; There are various ways to implement soft starting such as triac control, Y-Δ start, current limiting starter and voltage ramp-up starter and the like; Soft starts are used on electric motors in various applications. A motor soft starter is a device used with electric motors to temporarily reduce the load and torque in the power-train of the motor during startup; This reduces the mechanical stress on the motor and shaft, as well as the electrodynamics stresses on the attached power cables and electrical distribution network, extending the lifespan of the system; Motor soft starters can consist of mechanical or electrical devices, or a combination of both; Because there is no counter-emf in the rotor armature during start of the electric motor 12, a gear-meshed coupling unit of a ring geared flywheel 301 and a starting booster 401 of DC motor is provided to serve as an automatic soft starter and the performance improver of the present invention (as shown in FIG. 7); wherein said ring geared flywheel 301 is disposed on the exposed section of the rotor shaft 11 of the MG tandem 10 while said starting booster 401 of DC motor with a mounting rack and a pinion is firmly secured on the saddle chassis of the MG tandem 10 such that the pinion of the starting booster 401 is enabled to engage or disengage with the ring geared flywheel 301 in accordance with timely operating condition (as shown in FIGS. 7 and 8); An automobile self-starter (commonly "starter motor" or simply "starter") is an electric motor that initiates rotational motion in an internal combustion engine before it can power itself; Normally, a starter consists of the very powerful DC electric motor and starter solenoid that is attached to the motor for serving as a switch; When the ignition key is turned to the "Start" position, the battery voltage goes through the starter control circuit and activates the starter solenoid, which pushes out the drive pinion on the starter drive-shaft and meshes the pinion with the ring gear on the flywheel of the engine to energize the starter motor to crank the engine; The starter's pinion is clutched to its driveshaft through an overrunning sprag clutch, which permits the pinion to transmit drive in only one direction; Thereby, drive is transmitted through the pinion to the flywheel ring gear, but if the pinion remains engaged (as for example because the operator fails to release the key as soon as the engine starts), the pinion will be retracted and spin independently of its driveshaft; By reengineering the automobile self-starter via innovative adaptation, said ring geared flywheel 301 and starting booster 401 are contrived with flexibility in automatic engagement and disengagement mutually; Thus, once the common rotor armature shaft 11 is energized to rotate, the pinion of the starting booster 401 is engaged with the ring geared flywheel 301 so that an emf and a counter-emf are simultaneously induced in the armature of the common rotor armature shaft 11 to generate electric power and counter offset the surge of the inrush current until the synchronous electric motor-generator tandem 10 can run in rated performance, then the pinion of the starting booster 401 is automatically disengaged with the ring geared flywheel 301;

A battery is an electrochemical device that stores chemical energy which can be converted into electrical energy, thereby providing a direct-current voltage source. Two general types are the primary battery (non-rechargeable) and the secondary battery or storage battery (rechargeable); The lead-acid battery is the dominant storage battery, used in a wide variety of applications, including automotive SLI (starting, lighting, and ignition), traction for industrial trucks, emergency power, and UPS (uninterruptible power supplies); The attributes of lead-acid batteries include low cost, high discharge rate, and good performance at sub-ambient temperatures. The storage battery cluster 20 and single storage battery 201 used in the present invention are preferably lead-acid batteries due to whose advantageous attributes, but not limited, other storage types of storage battery including the nickel-cadmium, nickel-metal hydride, silver-zinc, sodium-sulfur, zinc-air, lithium-ion, and lithium-solid polymer electrolyte battery are also suitable to be used; Said storage battery cluster 20, which is configured from combination of multiple single batteries

Figure 10:
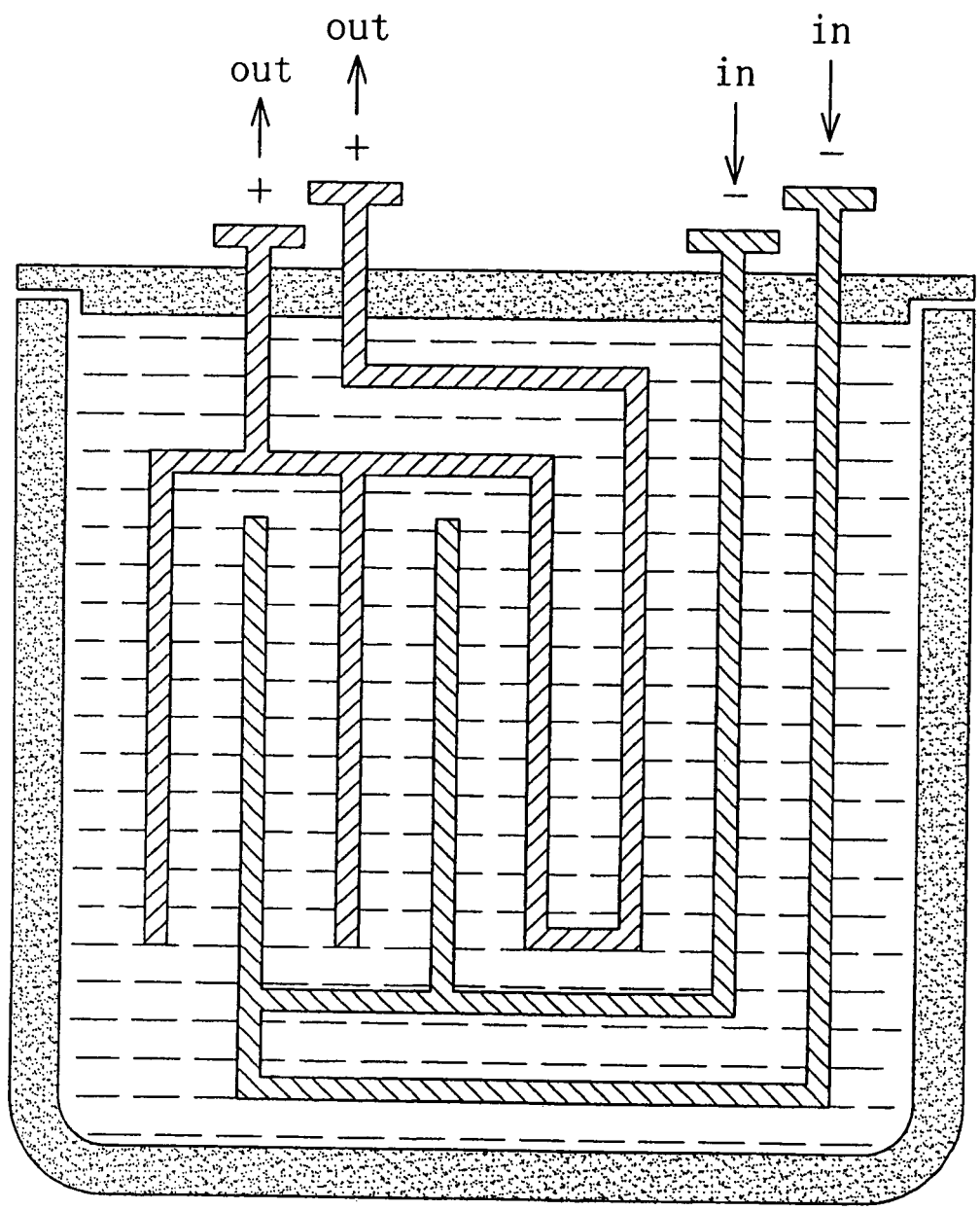
FIG. 10 is a referential schematic view showing pole terminals configuration of anode and cathode in a single battery for an exemplary embodiment of the "intelligent cascaded synchronous electric motor-generator tandems of cumulative compound excitation" in the present invention.

201 (for example 12V/200 A) in different series and parallel connection (as shown in FIGS. 7 and 10) such as two sets of five single batteries 201 series being either arranged in series mode to have resultant 120V/200 A output or arranged in parallel mode to have resultant 60V/400 A output, provides a DC power source to general loads in addition to supply starting current to electric motor 12, wherein the (DC commutator 160) of the electric generator 13 in the synchronous electric motor-generator tandem 10 is connect to corresponding electrode of the storage battery cluster 20 to serve as a recharging path; Each single storage battery 201 in the storage battery cluster 20 further comprises a set of battery anode-cathode terminals 202 including at least a negative electrode (the anode) terminals and at least a positive electrode (the cathode) terminals that are in contact with an electrolyte solution so that each negative electrode (the anode) terminal and positive electrode (the cathode) terminal are properly connected to corresponding suitable DC commutator 160 of the individual electric motor 12 and electric generator 13 respectively in the synchronous electric motor-generator tandem 10 to avoid reversing against each other during recharging sequence (as shown in FIG. 10); Moreover, the set battery anode-cathode terminals 202 of negative electrode terminals and positive electrode terminals enable the single storage battery 201 for being recharged by suitable external DC power supply; Besides, the series/parallel combination for every single storage battery 201 in the storage battery cluster 20 is arranged for having 60 v DC and 120 v DC output to offer optional versatility in practical usage;

Said autotransformer 30, which connects to the output brush terminals of the pair AC slip rings 170 in the electric generator 13 of the synchronous electric motor-generator tandem 10 (as shown in FIG. 1), serves to regulate the AC voltage output from the electric generator 13 via multiple taps thereon in step-up or step-down manner for supplying various AC voltages to different external loads.

The operating procedure is described as below:

1. A shunt DC power from the storage battery cluster 20 is simultaneously supplied to the electric motor 12 of DC motor in the MG tandem and the starting booster 401 respectively so that the rotor shaft 11 is directly driven by the electric motor 12 and indirectly driven by the starting booster 401 via engaged ring geared flywheel 301 to improve the start up operation of the rotor shaft 11, wherein the pinion of the starting booster 401 is enabled to engage with the ring geared flywheel 301 in initial start stage of the rotor shaft 11 so that the armature on the rotor shaft 11 is cranked to get enough rotational speed to simultaneously induce an emf and a counter-emf in the armature of the common rotor armature shaft 11 to generate electric power and counter offset the surge of the inrush current until the synchronous electric motor-generator tandem 10 can run in rated performance subsequently without any external boost, then the pinion of the starting booster 401 is automatically disengaged with the ring geared flywheel 301; Since said electric motor 12 and electric generator 13 have a common stator 101 with a frame and a common rotor shaft 11 with an armature in the present invention, the stator pole coil windings 120 and 130 are specially configured to meet specific tandem requirement so that the arrangement of each winding 120 and winding 130 in all slots of the stator 101 are interlaced into parallel winding modes of double-layer or multilayer state, the safety protection in preventing from malfunction due to breakage of any-one winding is provided; Besides, by conjunction of Fleming's left-hand rule and Fleming's right-hand rule, the electromechanical energy conversion between the electric motor 12 and electric generator 13 via electromotive force (emf) or rotational counter-emf and kinetic energy can be effectively achieved by the present invention in synergistic manner (as shown in FIGS. 11 and 12); Thus, by synergistic means of common rotor shaft 11 with an armature and the (stator 101), the rotational kinetic energy of the (electric motor 12) can not only be used to drive the electric generator 13 in tandem but also output to drive external machinery.

Figure 6:
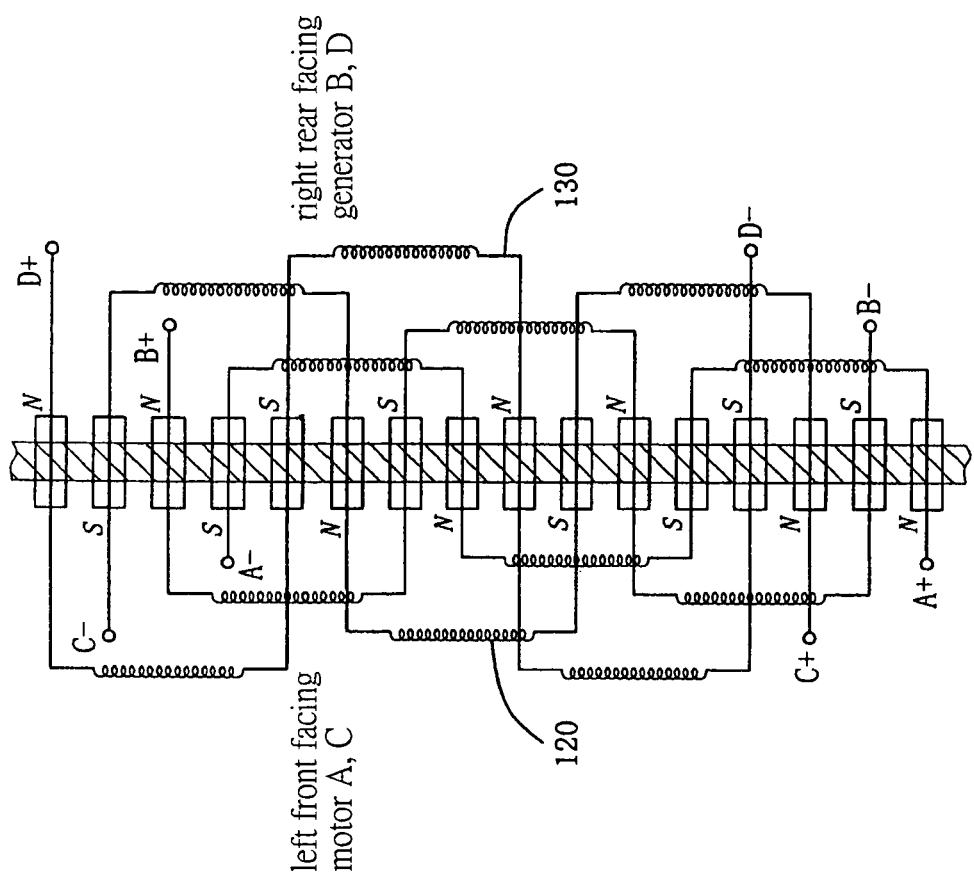
FIG. 6 is a referential circuit schematic view showing orderly interlaced primary field winding of the common stator for previous FIG. 5 of a single "synchronous electric motor-generator tandem" in the present invention.
Figure 5:
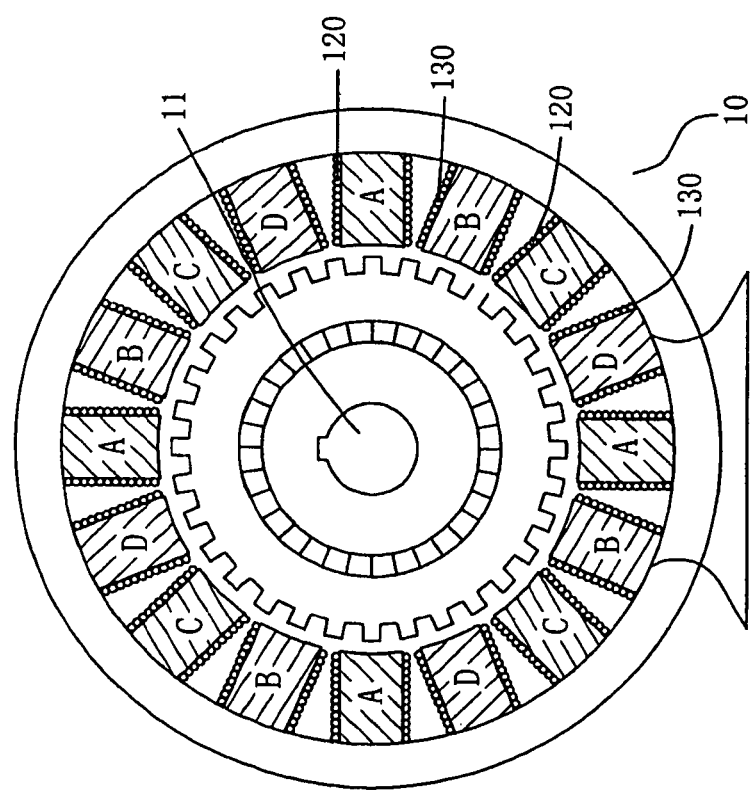
FIG. 5 is a planar cross section view showing primary field winding of the common stator for precedent left motor A, C and subsequent right generator B, D respectively for an exemplary embodiment of a single "synchronous electric motor-generator tandem" in the present invention.

2. Once the start up operation of the rotor shaft 11 is built up to normal rated state, the electric generator 13 is well driven to generate DC output via the DC commutator 160 thereof and AC power output via pair AC slip rings 170 thereof such that the DC power output is fed back to storage battery cluster 20 for recharging and to adjacent starting booster 401 for interactive support while the AC power output is transmitted to various external loads via different taps of the autotransformer 30; In this manner, the "synchronous electric motor-generator tandems" can be independently used as an enhanced electric motor 12 system or an enhanced electric generator 13 system; Namely, when the "synchronous electric motor-generator tandems" in the present invention is independently used as an enhanced electric motor 12 system, a DC power, which is output from the DC commutator 160 of the associated electric generator 13, not only can recharge the battery cluster 20 in feedback manner but also can supply to starting booster 401 of DC motor for constantly supporting the normal operation of the electric motor 12; Thus, by means of the common rotor shaft 11 in the synchronous electric motor-generator tandem 10 and individual commutator 160 and pair AC slip rings 170 for the electric motor 12 and electric generator 13 respectively, a DC power output from the DC commutator 160 of the electric generator 13 can be fed back to the DC commutator 160 of the electric motor 12 to keep the synchronous electric motor-generator tandem 10 running while an AC power output from the pair AC slip rings 170 of the electric generator 13 can be supplied to external loads; Besides, the storage battery cluster 20 provides a DC starting power to electric motor 12 in addition to supply DC power source to general loads, In conventional DC electric machines, an armature reaction of uneven magnetic flux and magnetic density distribution will happen between the tip front and tip rear for each pole piece (tooth) in the stator that the armature reaction causes a distorted flux-density distribution either to shift the mean magnetism forward or backward. Due to the saturation of the armature pole teeth, the flux density is decreased by a greater amount under one pole tip than it is increased under the other, and therefore the armature reaction produces a demagnetizing effect, grow magnetizing effect and crossover magnetizing effect by the internal uneven field. Thereby, the generated voltage or counter-voltage will be reduced when the armature is loaded unless a pole-face winding (compensating winding) or dual-mode winding contrived in the present invention described as below, embedded in slots in the pole face and excited by armature current, is provided to neutralize the armature mmf under the pole faces;

For the purpose in solving armature reaction of uneven magnetic flux and magnetic density distribution, as shown in FIGS. 5 and 6, each said synchronous electric motor-generator tandem 10 can be arranged in dual mode to comprise two electric motors 12 of motor A and motor C and two electric generators 13 of generator B and generator D having a common stator 101 with a frame and a common rotor shaft 11 with an armature, wherein each said electric motor 12 has an individual stator pole coil winding 120 while each said electric generator 13 has an individual stator pole coil winding 130 respectively; Namely, electric motor A has a stator pole coil winding 120A, electric generator B has a stator pole coil winding 130B, electric motor C has a stator pole coil winding 120C and electric generator D has a stator pole coil winding 130D such that all the stator pole coil windings are orderly arranged in interlaced state as in order of stator pole coil winding 120A, stator pole coil winding 120B, stator pole coil winding 120C and stator pole coil winding 120D consecutively.

What is claimed is:

1. An intelligent-cascaded synchronous electric motor-generator tandems of cumulative compound excitation comprising at least a synchronous electric motor-generator tandem with a saddle chassis, a storage battery cluster connected to the electric motor-generator tandem, an autotransformer connected to the electric generator, at least a ring geared flywheel connected to a shaft of the motor-generator tandem, and a starting booster of DC motor with a mounting rack and a pinion coupled to the saddle chassis of the motor-generator tandem, wherein:

each said synchronous electric motor-generator tandem comprises at least a pair of electric motor and electric generator having a common stator with a frame and a common rotor shaft having an armature with a motor winding for the motor and a generator winding interlaced respectively;

both of said motor winding and generator winding configured to rotate in same direction coincidentally on the same common rotor shaft;

each said electric motor has a stator pole coil winding and a rotor armature coil winding while said electric generator has a stator pole coil winding and a rotor armature coil winding respectively such that the arrangement of each winding in respective slots of a core of the rotor shaft armature and the common stator are grouped and interlaced in right facing set and left facing set to be specially configured by versatile combinations;

said storage battery cluster configured to provide a DC power source to general loads in addition to supply starting current to the electric motor and working DC power supply to external loads, and configured to serve as a DC power reservoir to be recharged by DC output of the electric generator in the synchronous electric motor-generator tandem; and said autotransformer connected to output brush terminals of the electric generator of the MG tandem configured to regulate AC voltage output from the electric generator via multiple taps thereon in step-up or step-down manner for supplying various AC voltages to different external loads.

2. The synchronous electric motor-generator tandems as claimed in claim 1, wherein each said synchronous electric motor-generator tandem comprises at least a pair of electric motor and electric generator having a common stator with a stator coil and a common rotor shaft having an armature with the motor winding for the motor and the generator winding interlaced respectively within said synchronous electric motor-generator tandem, said common stator and common rotor shaft are made of ferromagnetic material; said stator coil of the common stator are grouped and interlaced in right facing set and left facing set so that the stator coil is spaced at equal distances around the circumference of the stator.

3. The synchronous electric motor-generator tandems as claimed in claim 1, wherein each said electric motor and electric generator, which is respectively mounted on front and rear positions of the common rotor shaft in tandem manner to have the stator pole coil winding and the rotor armature coil winding in the electric motor and the stator pole coil winding and the rotor armature coil winding in the electric generator respectively, is further respectively equipped a DC commutator and a pair of AC slip ring for individual electric input/output (I/O) function, and said rotor armature coil winding in the electric motor and rotor armature coil winding in the electric generator are specially configured by versatile combination of Lap Winding and Wave Winding.

4. The synchronous electric motor-generator tandems as claimed in claim 1, wherein said synchronous electric motor-generator tandem is arranged into a triple cascaded synchronous electric motor-generator tandem set of helical progressive mode including three synchronous electric motor-generator tandems on the common rotor shaft being orderly arranged in overall out of phase angle 90 degree for each quadrant with helical progressive 30 degree increment advancement instead of linear in phase arrangement so that the triple cascaded synchronous electric motor-generator tandem set will leave only one synchronous electric motor-generator tandem in the pole neutral point while other two synchronous electric motor-generator tandems will be deviated from the pole neutral point, thereby with at least two synchronous electric motor-generator tandems being deviated from the pole neutral point, the triple cascaded synchronous electric motor-generator tandem set can perform smoothly anytime in consequence of no common dead point happened in triple cascaded synchronous electric motor-generator tandem set regarding the relative pole position between rotor and stator.

5. The synchronous electric motor-generator tandems as claimed in claim 1, wherein each said synchronous electric motor-generator tandem is arranged in a dual mode to comprise two electric motors and two electric generators having a common stator with a frame and a common rotor shaft with an armature such that each said electric motor has an individual stator pole coil winding while each said electric generator has an individual stator pole coil winding respectively for being orderly arranged in interlaced dual mode winding state, moreover, said dual mode winding is also arranged and combined into multilayer and helical progressive mode as well as be functioned as a pole-face winding to neutralize the armature mmf under the pole face in solving harmful armature reaction of uneven magnetic flux and magnetic density distribution among pole tips.

6. The synchronous electric motor-generator tandems as claimed in claim 1, wherein said stator pole coil windings of the electric motor and electric generator are specially interlaced into parallel winding modes of double-layer of multiple loop or nested multilayer state so that further safety protection is provided in preventing from single synchronous electric motor-generator tandem malfunction due to breakage of any winding.

7. The synchronous electric motor-generation tandems as claimed in claim 1, wherein each single storage battery in the storage battery cluster further comprises a set of battery anode-cathode terminals including at least a negative electrode (anode) terminal and at least a positive electrode (cathode) terminal that are in contact with an electrolyte solution so that each negative electrode (anode) terminal and positive electrode (cathode) terminal are properly connected to corresponding suitable DC commutator of the individual electric motor and electric generator respectively in the synchronous electric motor-generator tandem to avoid reversing against each other during recharging sequence, moreover, the set battery anode-cathode terminals of negative electrode terminals and positive electrode terminals enable the single storage battery for being recharged by suitable external DC power supply.

\* \* \* \* \*